US012645217B2

(12) United States Patent
Nister et al.

(10) Patent No.: US 12,645,217 B2
(45) Date of Patent: Jun. 2, 2026

(54) PATH PLANNING

(71) Applicant: NVIDIA Corporation, Santa Clara, CA (US)

(72) Inventors: David Nister, Bellevue, WA (US); Yizhou Wang, San Ramon, CA (US); Jaikrishna Soundararajan, College Station, TX (US); Sachit Kadle, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 197 days.

(21) Appl. No.: 18/494,374

(22) Filed: Oct. 25, 2023

(65) Prior Publication Data

US 2024/0053749 A1 Feb. 15, 2024

Related U.S. Application Data

(63) Continuation of application No. 17/352,777, filed on Jun. 21, 2021, now Pat. No. 11,860,628.

(51) Int. Cl.
*G05D 1/00* (2024.01)
*B60W 30/06* (2006.01)
(Continued)

(52) U.S. Cl.
CPC ........... *G05D 1/0088* (2013.01); *B60W 50/06* (2013.01); *B60W 60/0015* (2020.02);
(Continued)

(58) Field of Classification Search
CPC ...... G05D 1/0088; G05D 1/0214; G06T 7/70; G06T 1/20; G06T 2207/30241;
(Continued)

(56) References Cited

U.S. PATENT DOCUMENTS 5,870,303 A * 2/1999 Trovato .............. G05D 1/0217
700/61
9,522,675 B1 * 12/2016 You .................... B62D 15/0285
(Continued)

FOREIGN PATENT DOCUMENTS

CN 105857306 A 8/2016
CN 110561431 A 12/2019
(Continued)

OTHER PUBLICATIONS

Gurung et al, "Parallel Reachability Analysis for Hybrid Systems", 2016, IEEE (Year: 2016).*
(Continued)

*Primary Examiner* — Kenneth M Dunne
(74) *Attorney, Agent, or Firm* — IRON SUMMIT IP LLP

(57) ABSTRACT

To determine a path through a pose configuration space, trajectories of poses may be evaluated in parallel based at least on translating the trajectories along at least one axis of the pose configuration space (e.g., an orientation axis). A trajectory may include at least a portion of a turn having a fixed turn radius. Turns or turn portions that have the same turn radius and initial orientation can be translatively shifted along and processed in parallel along the orientation axis as they are translated copies of each other, but with different starting points. Trajectories may be evaluated at least on processing variables used to evaluate reachability as bit vectors with threads effectively performing large vector operations in synchronization. A parallel reduction pattern may be used to account for dependencies that may exist between sections of a trajectory for evaluating reachability, allowing for the sections to be processed in parallel.

20 Claims, 21 Drawing Sheets

(51) Int. Cl.

| | |
|---|---|
| *B60W 30/09* | (2012.01) |
| *B60W 50/06* | (2006.01) |
| *B60W 60/00* | (2020.01) |
| *G06T 1/20* | (2006.01) |
| *G06T 7/70* | (2017.01) |
| *G06V 20/58* | (2022.01) |

(52) U.S. Cl.
CPC ............. *G05D 1/0214* (2013.01); *G06T 1/20* (2013.01); *G06T 7/70* (2017.01); *G06V 20/58* (2022.01); *B60W 30/06* (2013.01); *B60W 30/09* (2013.01); *G06T 2207/30241* (2013.01); *G06T 2207/30261* (2013.01)

(58) Field of Classification Search
CPC .... G06T 2207/30261; B60W 60/0015; B60W 50/06; B60W 30/06; B60W 30/09; G06V 20/58

See application file for complete search history.

(56) References Cited

U.S. PATENT DOCUMENTS

| | | | | |
|---|---|---|---|---|
| 9,969,386 | B1 * | 5/2018 | Wang | B62D 15/027 |
| 10,106,153 | B1 * | 10/2018 | Xiao | G06V 10/82 |
| 10,885,698 | B2 | 1/2021 | Muthler et al. | |
| 11,860,628 | B2 | 1/2024 | Nister et al. | |
| 2015/0134185 | A1 * | 5/2015 | Lee | B62D 15/0285 701/26 |
| 2018/0180428 | A1 * | 6/2018 | Grimm | G08G 3/02 |
| 2018/0201256 | A1 * | 7/2018 | Tseng | B60W 10/20 |
| 2018/0345955 | A1 * | 12/2018 | Kim | B62D 15/0285 |
| 2020/0041287 | A1 * | 2/2020 | Tagawa | B60W 30/06 |
| 2021/0020045 | A1 * | 1/2021 | Huang | G05D 1/692 |
| 2021/0163068 | A1 * | 6/2021 | Zhu | B62D 15/0285 |
| 2021/0370916 | A1 * | 12/2021 | Ishinoda | B60W 30/06 |
| 2022/0404829 | A1 | 12/2022 | Nister et al. | |

FOREIGN PATENT DOCUMENTS

| | | |
|---|---|---|
| CN | 110618678 A | 12/2019 |
| CN | 111063211 A | 4/2020 |
| CN | 112829740 A | 5/2021 |
| FR | 2995274 A3 | 3/2014 |
| WO | 2021016116 A1 | 1/2021 |

OTHER PUBLICATIONS

Nister, David; Second Office Action for Chinese Patent Application No. 202210564756.3, filed May 23, 2022, mailed May 28, 2025, 5 pgs.

Nister, David; Notice of Registration for Chinese Patent Application No. 202210564756.3, filed May 22, 2023, mailed Jul. 23, 2025, 3 pgs.

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Nister, David; Non-Final Office Action for U.S. Appl. No. 17/352,777, filed Jun. 21, 2021, mailed May 31, 2023, 41 pgs.

Berger, et al.; "Exact Solution for Search-and-Rescue Path Planning", 2013, International Journal of Computer and Communication Engineering vol. 2 No 3, 6 pgs.

English Translation of CN105857306A, Aug. 17, 2016, 8 pgs.

Machine Translation of FR 2995274 A3; Mar. 14, 2014; 6 pgs.

Lozano-Perez, et al.; "Parallel Robot Motion Planning", 1991, IEEE, International Conference on Robotics and Automation Sacramento, 1991, 8 pgs.

Nisted, David; Notice of Allowance for U.S. Appl. No. 17/352,777, filed Jun. 21, 2021, mailed Aug. 30, 2023, 7 pgs.

Zaghloul, Soha S., et al. (2017). Parallelizing A* Path Finding Algorithm. International Journal of Engineering and Computer Science. vol. 6. Issue 9. p. No. 22469-22476.

Liu, et al. (Jun. 2017). Boundary Layer Heuristic for Search-Based Nonholonomic Path Planning in Maze-Like Environments. In 2017 IEEE Intelligent Vehicles Symposium (IV) (pp. 831-836). IEEE, 6 pgs.

Hart, et al. (1968). A formal basis for the heuristic determination of minimum cost paths. IEEE transactions on Systems Science and Cybernetics, 4(2), 100-107, 8 pgs.

Cheng, et al. (2014). Professional CUDA c programming. John Wiley & Sons, 527 pgs.

I. Rafia, "A* Algorithm for Multicore Graphics Processors," M.S. thesis, Department of Computer Science and Engineering, Chalmers University of Technology, Gothenburg, Sweden, 2010, 63 pgs.

Mahafzah, B. A. (2014). Performance evaluation of parallel multithreaded A* heuristic search algorithm. journal of Information Science, 40(3), 363-375, 13 pgs.

Phillips, et al. (May 2014). PA* SE: Parallel A* for slow expansions. In Twenty-Fourth International Conference on Automated Planning and Scheduling, 9 pgs.

Rios, et al. (2011). Pnba*: A parallel bidirectional heuristic search algorithm. In ENIA VIII Encontro Nacional de Inteligência Artificial, 12 pgs.

Brand, et al. (2012). Multi-core scalable and efficient pathfinding with Parallel Ripple Search. computer animation and virtual worlds, 23(2), 73-85, 13 pgs.

Paeth, A. W. (Aug. 1986). A fast algorithm for general raster rotation. In Proceedings on Graphics Interface'86/Vision Interface'86 (pp. 77-81). 5 pgs.

Nister, David; First Office Action for Chinese Patent Application No. 202210564756.3, filed May 22, 2023, mailed Jan. 16, 2025, 25 pgs.

Nister, David; First Office Action for Japanese Patent Application No. 2022-032253, filed Mar. 3, 2022, mailed Oct. 31, 2025, 8 pgs.

* cited by examiner

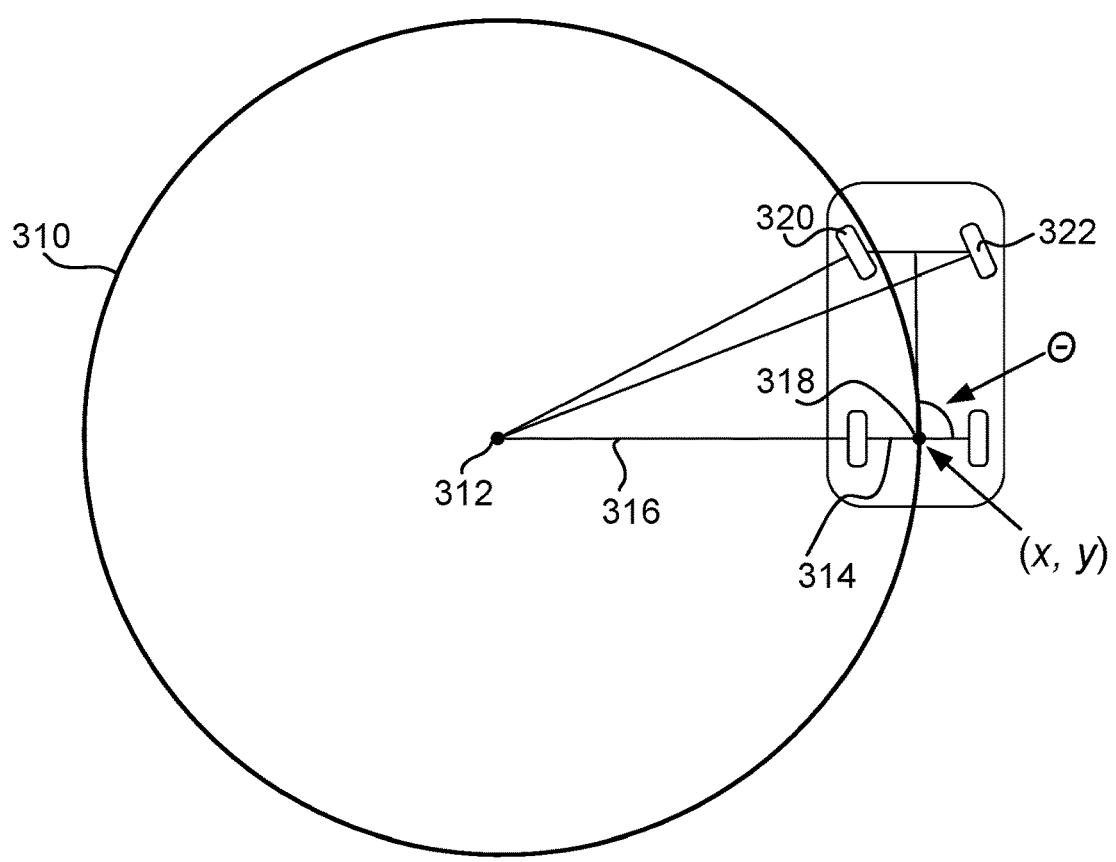
FIGURE 3

```
for (c=0, i=0; i<M; i++)
{
  c    = max(c+1, O[i]);    //Update cost
  c    = min(c, Ri[i]);     //Update cost
  Ro[i] = c;                //Store back
}
```

1000

DETERMINE SHIFTED POSES BASED AT LEAST ON
TRANSLATING POSES OF A POSE CONFIGURATION SPACE
TO PRODUCE SHIFTED TRAJECTORIES THAT INCLUDE THE
SHIFTED POSES
B1002

DETERMINE A PATH THROUGH THE POSE CONFIGURATION
SPACE BASED AT LEAST ON EVALUATING REACHABILITY OF
THE SHIFTED POSES USING PARALLEL PROCESSING OF THE
SHIFTED TRAJECTORIES
B1004

1100

TRANSLATE TRAJECTORIES OF POSES IN A POSE
CONFIGURATION SPACE INTO SHIFTED TRAJECTORIES THAT
INCLUDE AT LEAST SECTIONS PARALLEL TO ONE ANOTHER
AND TO AT LEAST ONE AXIS OF THE POSE CONFIGURATION
SPACE
B1102

PROCESSING AT LEAST THE SECTIONS OF THE SHIFTED
TRAJECTORIES IN PARALLEL ALONG THE AT LEAST ONE
AXIS TO COMPUTE INDICATORS OF REACHABILITY
ASSOCIATED WITH THE SHIFTED TRAJECTORIES
B1104

DETERMINE A PATH THROUGH THE POSE CONFIGURATION
SPACE BASED AT LEAST ON THE INDICATORS OF
REACHABILITY
B1106

FIGURE 11

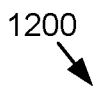

1200

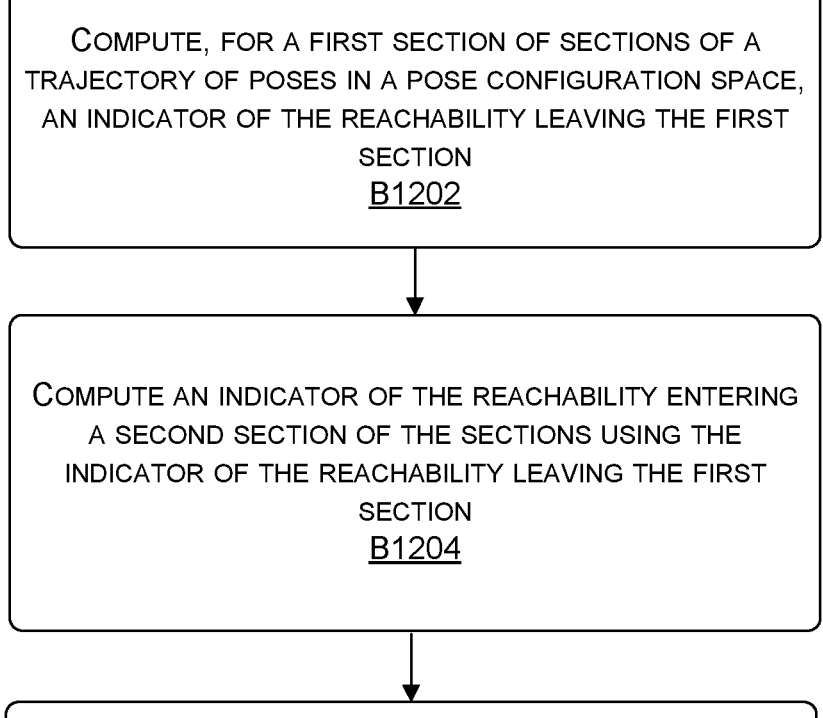

COMPUTE, FOR A FIRST SECTION OF SECTIONS OF A TRAJECTORY OF POSES IN A POSE CONFIGURATION SPACE, AN INDICATOR OF THE REACHABILITY LEAVING THE FIRST SECTION
B1202

COMPUTE AN INDICATOR OF THE REACHABILITY ENTERING A SECOND SECTION OF THE SECTIONS USING THE INDICATOR OF THE REACHABILITY LEAVING THE FIRST SECTION
B1204

COMPUTE AN INDICATOR OF THE REACHABILITY FOR A POSE WITHIN THE FIRST SECTION USING THE INDICATOR OF THE REACHABILITY ENTERING THE SECOND SECTION
B1206

Figure 14:
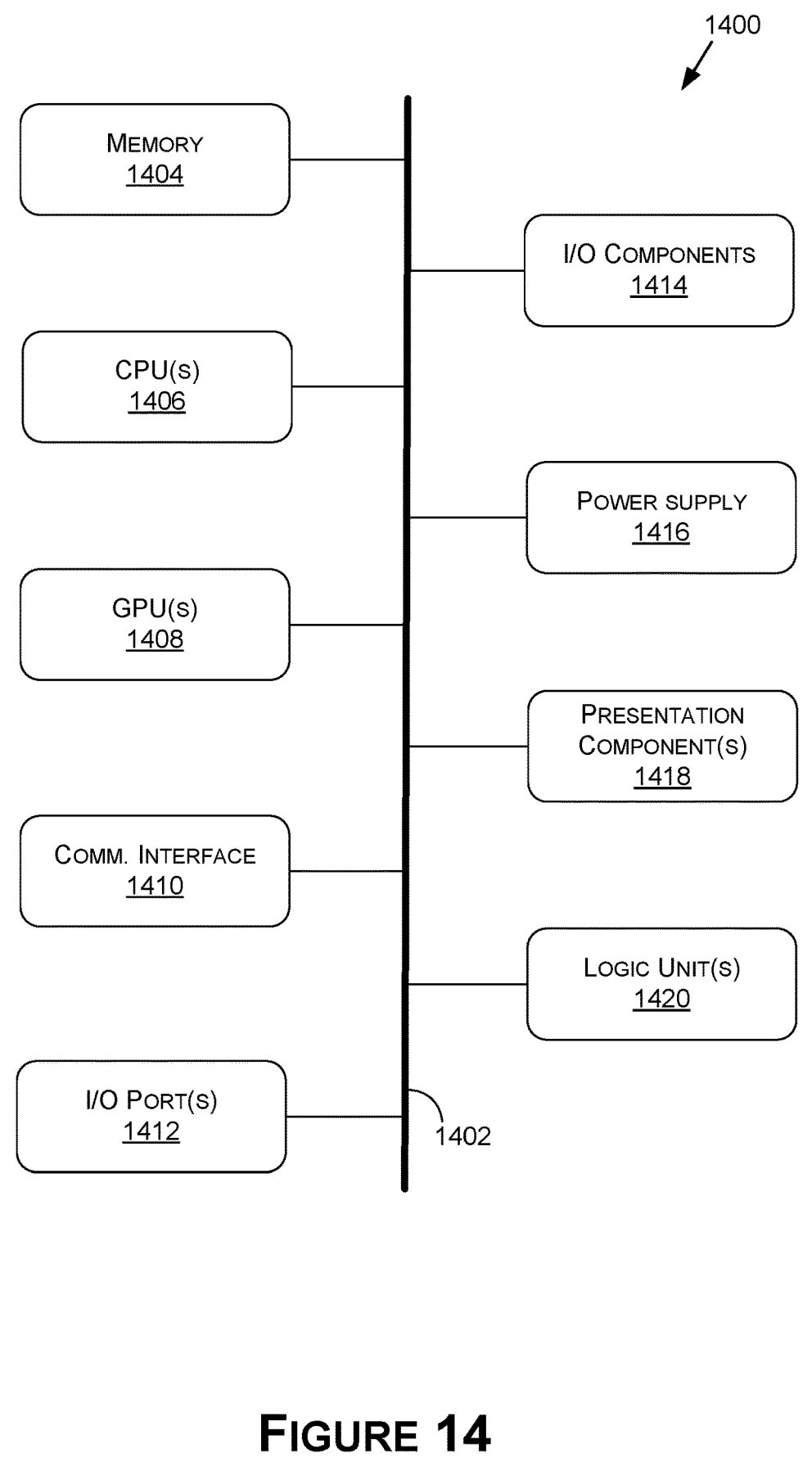

MEMORY
1404

I/O COMPONENTS
1414

CPU(s)
1406

POWER SUPPLY
1416

GPU(s)
1408

PRESENTATION
COMPONENT(S)
1418

COMM. INTERFACE
1410

LOGIC UNIT(S)
1420

I/O PORT(S)
1412

PATH PLANNING

CROSS-REFERENCE TO RELATED APPLICATIONS

This application is a Continuation of a U.S. patent application Ser. No. 17/352,777, filed Jun. 21, 2021, which is hereby incorporated by reference in its entirety.

BACKGROUND

In order to control a vehicle or other maneuverable object, a suggested path from a current pose (e.g., position and orientation) of the vehicle to a target pose for the vehicle may be determined (e.g., for autonomous parking operations). Determining a suggested path for a vehicle may include exploring potential paths in a configuration space under non-holonomic constraints dictated by vehicle kinematics. Traditional approaches to solving this problem may use a graph search (e.g., A*) with a heuristic that reduces the search space by incentivizing early exploration of promising paths. However, the best paths may not be immediately apparent and therefore may not be identified in scenarios. Likewise, environments in which the heuristic does not accurately apply as a heuristic may not be applicable in all situations.

In addition, algorithms used by traditional systems may be only mildly parallelized. For example, parallel implementations of A* have been developed that use eight processing threads to yield speed-ups of a factor of four. However, modern parallel processors can make available thousands of processor cores that allow for much higher levels of parallelism. Due to the limited parallelization offered by conventional approaches, the density of the configuration space that is explored is often relatively sparse in order to allow paths to be determined in a computationally efficient manner. That is, if the configuration space is too dense, then identifying a path with traditional approaches may take too long or consume too many resources for practical application. As such, the number of potential paths that can be determined may be limited by the density of the configuration space.

SUMMARY

Embodiments of the present disclosure relate to a massively parallel vehicle path planning suitable for parking. Systems and methods are disclosed that may determine a path of a vehicle through a pose configuration space in a highly parallelized manner.

In contrast to traditional approaches, such as those described above, disclosed approaches may be used to rapidly explore paths (e.g., all paths) in a dense pose configuration space in parallel to determining a path through the pose configuration space. Trajectories of poses in the pose configuration space may be evaluated in parallel based at least on translating the trajectories along at least one axis of the pose configuration space (e.g., a θ-axis representing vehicle orientation). In at least one embodiment, a trajectory may include at least a portion of a turn having a fixed turn radius. Turns that have the same turn radius and initial orientation can be translatively shifted along and processed in parallel along the θ-axis as they are translated copies of each other, but with different starting points (x, y). In further respects, trajectories may be evaluated based at least on processing variables used to evaluate reachability as bit vectors. Logical bit-wise operations may be performed by each processing thread to control propagation of reachability while avoiding conditional processing or branches so that the threads may effectively be performing large vector operations in synchronization. Disclosed approaches may use a parallel reduction pattern to account for dependencies that may exist between sections of a trajectory for evaluating reachability, allowing for the sections to be processed in parallel.

BRIEF DESCRIPTION OF THE DRAWINGS

The present systems and methods for parallel processing of vehicle path planning suitable for parking are described in detail below with reference to the attached drawing figures, wherein:

FIG. 3 illustrates an example of a motion model that may be used to define trajectories of the vehicle through the pose configuration space, in accordance with some embodiments of the present disclosure;

FIG. 4 is an illustration of an example of an occupancy space that captures occupancy of poses in a pose configuration space, in accordance with some embodiments of the present disclosure;

FIG. 11 is a flow diagram showing a method 1100 for translating trajectories of poses in a pose configuration space into shifted trajectories to determine a path through the pose configuration space, in accordance with some embodiments of the present disclosure;

FIG. 12 is a flow diagram showing a method 1200 for evaluating reachability of sections of a trajectory in parallel, in accordance with some embodiments of the present disclosure;

FIG. 14 is a block diagram of an example computing device suitable for use in implementing some embodiments of the present disclosure.

DETAILED DESCRIPTION

Figure 1A:
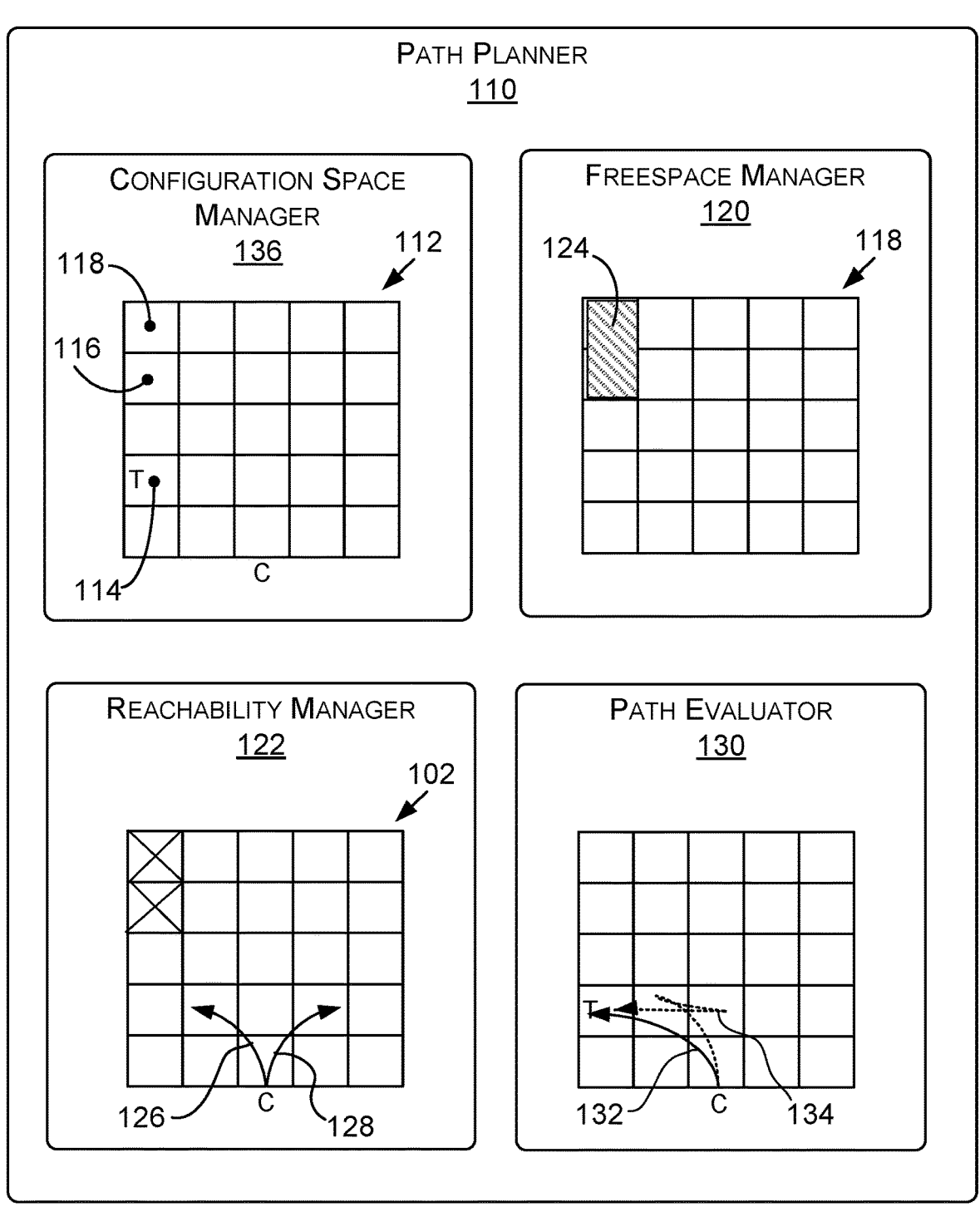
FIG. 1A is an illustration including an example of a path planner, in accordance with some embodiments of the present disclosure.

Systems and methods are disclosed related to a parallel processing of vehicle path planning suitable for parking. Although the present disclosure may be described with respect to an example autonomous vehicle 1300 (alternatively referred to herein as "vehicle 1300" or "ego-vehicle 1300," an example of which is described with respect to FIGS. 13A-13D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to path or route planning for autonomous or semi-autonomous driving, this is not intended to be limiting, and the systems and methods described herein may be used for path planning in augmented reality, virtual reality, mixed reality, robotics, security and surveillance, autonomous or semi-autonomous machine applications, and/or any other technology spaces where path or route planning may be used.

In a parking application, an objective may be to maneuver a vehicle under non-holonomic constraints into a parking spot (e.g., from within roughly line of sight distances), while avoiding collision with obstacles (e.g., other vehicles, pillars, barriers, walls, parking structures, pedestrians, etc.). Systems and methods are disclosed that may determine a path (e.g., a multi-point turn suitable for parking or maneuvering in tight quarters) of a vehicle from a current pose to a target pose in a pose configuration space, in which poses may be in freespace or blocked by an obstacle (e.g., perceived obstacle based on vehicle sensor data). That is, several different paths may exist from the current pose to the target pose, and each path may be made up of different combinations of turns (e.g., sharp left, slight left, straight, slight right, and sharp right) and directions (e.g., forward and reverse). Moreover, one or more obstacles may be positioned along one or more of the paths. Disclosed approaches may be used to evaluate the paths to identify a recommended path around the obstacle(s) and to the target pose based on one or more criteria (e.g., shortest distance, fastest, lowest number of turns, etc.).

Disclosed approaches may be used to rapidly explore paths (e.g., all paths) in a dense pose configuration space in parallel when determining a recommended path from a current pose to a target pose (e.g., within a target set of poses). An iterative approach may be used where in an iteration, reachability of a set of trajectories may be evaluated in parallel, and the results may serve as inputs to evaluate reachability of the set of trajectories (or a different set of trajectories) in a subsequent iteration (effectively extending reachable trajectories with additional trajectories). Inferior path recommendations may be avoided by thoroughly exploring path possibilities. While this amount of work might traditionally be too large to practically execute for dense pose configuration spaces, disclosed approaches allow for massive parallelism that can take advantage of modern parallel processing architectures (e.g., having thousands of cores and/or threads). As such, dense pose configuration spaces can be explored significantly faster, more efficiently, and/or at a much lower granularity (e.g., higher spatial and angular density) than previously possible.

In at least one embodiment, a pose configuration space may represent poses of a vehicle in an environment using at least x and y-axes for the position of the vehicle and a $\theta$-axis for an orientation (e.g., heading angle) of the vehicle. Massive parallelism may arise, at least in part, by evaluating trajectories of poses in a pose configuration space in parallel based at least on translating the trajectories along at least one axis of the pose configuration space (e.g., a $\theta$-axis). Such an arrangement allows for the trajectories and/or portions thereof to be worked on independently for parallel processing. For example, at least some of the poses of the trajectories may be shifted (e.g., on-the-fly or in advance using a common translation function) to form parallel lines—one or more sections of which may be independently processed through in parallel to evaluate reachability.

In one or more embodiments, a trajectory may include at least a portion of a turn having a fixed turn radius. Where a trajectory is a turn, it may form a cyclical or a straight trajectory (for an infinite turn radius). Disclosed approaches may leverage the property that each turn (or portion thereof) of turns that have the same turn radius and initial orientation (the same turn type) may be a translated copy of each of the other turns (or corresponding portions thereof), but with a different starting point (x, y), stemming from the fact that the vehicle may behave the same way regardless of where it is initially positioned. Thus, the turns (or turn portions) of the turn type that correspond to different trajectories can be translatively shifted along and processed in parallel along the $\theta$-axis.

In further respects, variables used to evaluate reachability may comprise bits representing binary values (e.g., reachable or not, freespace or not), with each pose corresponding to a respective bit of a variable. Thus, trajectories may be evaluated based at least on processing the variables as bit vectors. For example, one trajectory per bit of a bit vector may be evaluated in parallel. Logical bit-wise operations may be performed by each thread to control propagation of reachability while avoiding conditional processing or branches—which are non-conducive to parallel processing—so that the threads may effectively perform large vector operations in synchronization. Thus, this approach may be suitable for a modern parallel processor, which thrives on large vector operations well aligned in memory in a Simultaneous Instruction Multiple Thread (SIMT) manner.

The disclosure also provides approaches which may be used to divide the processing work used to evaluate the trajectories into sections of the trajectories, allowing for those sections to be evaluated in parallel rather than entire trajectories. Sections of a trajectory may not be independent from one another since reachability may ripple through the entire trajectory (e.g., both forwards and backwards for a cyclical trajectory). This dependency may pose an obstacle to processing the sections in parallel. Disclosed approaches may handle this dependency using a parallel reduction pattern that gathers the results from sections (e.g., computed in parallel) hierarchically, performs some small amount of processing with the gathered results (e.g., in parallel), and then scatters the results back out again as inputs to individual sections for further processing (e.g., in parallel).

The present path planner may present additional opportunities for parallelism. For example, when processing reachability of each turn of each turn type, the turn may be divided into turn subsections, and each turn subsection may be semi-independently processed by a separate thread. Among other things, the option to independently process turn subsections may permit the work to be spread out over more threads (if available). In addition, because the turn subsections are likely shorter than full turns, memory latencies may be reduced since it is less likely that one thread will be stalled (for as long) waiting for another thread to finish.

With reference to FIG. 1A, FIG. 1A is an illustration including an example of a path planner 110, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In at least one embodiment, the path planner 110 may include a configuration space manager 136, a freespace manager 120, a reachability manager 122, and a path evaluator 130. The configuration space manager 136 may manage a pose configuration space 112, which represents poses (e.g., poses 114, 116, and 117) comprising positions and orientations of a vehicle (or other object) in an environment (e.g., a parking lot).

The freespace manager 120 and the reachability manager 122 may process the pose configuration space 112 to determine one or more paths for maneuvering from a current pose C to a target pose T (or generally between any two poses) in the pose configuration space 112. For example, the freespace manager 120 may collision test the vehicle with objects 124 in the environment to determine an occupancy space(s) 118 that may capture which poses may be blocked or occupied (e.g., the pose 116 and the pose 118) and which poses may be free or unoccupied (e.g., the pose 114). The reachability manager 122 may analyze at least portions of trajectories (e.g., the trajectories 126 and 128) of poses that the vehicle may traverse in the pose configuration space 112 to determine a reachability space(s) 102 (which may also be referred to as a cost space) that may capture which poses in the pose configuration space 112 are reachable by the trajectories and/or costs of reaching those poses. The path evaluator 130 may identify one or more proposed or potential paths for the vehicle based at least on the assessment by the reachability manager 122. For example, the path evaluator 130 may identify and/or evaluate the paths or multi-segment trajectories (e.g., paths 132 and 134) based on one or more criteria (e.g., distance, number of turns, number of gear changes, cost, reachability, etc.).

Figure 1B:
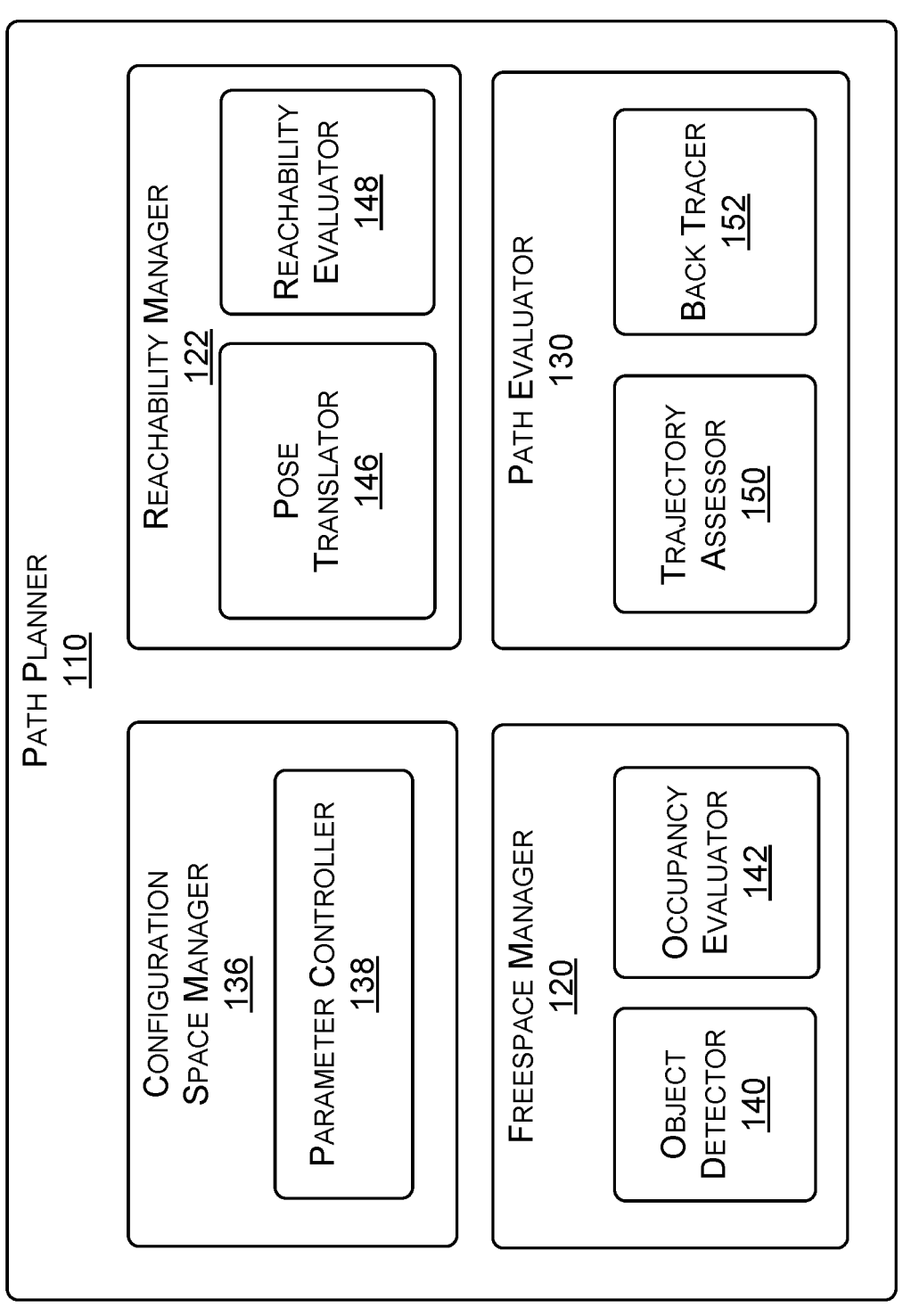
FIG. 1B is an illustration showing additional elements that may be included in the path planner of FIG. 1A, in accordance with some embodiments of the present disclosure.

Referring now to FIG. 1B, FIG. 1B is an illustration showing additional elements that may be included in the path planner 110 of FIG. 1A, in accordance with some embodiments of the present disclosure. The configuration space manager 136 may include a parameter controller 138, the reachability manager 122 may include a pose translator 146 and a reachability evaluator 148, the freespace manager 120 may include an object detector 140 and an occupancy evaluator 142, and the path evaluator 130 may include a trajectory assessor 150 and a back tracer 152.

In at least one embodiment, the configuration space manager 136 may facilitate operations related to the pose configuration space 112 using the parameter controller 138 to configure parameters of the pose configuration space 112. The pose configuration space 112 may represent vehicle poses using a space, such as multi-dimensional space (e.g., a 3D space). For example, the vehicle may be in a driving environment (e.g., a parking lot). Each pose in the pose configuration space 112 may include at least a vehicle position in the driving environment, and an orientation of the vehicle at the vehicle position. In at least one embodiment, the positions within the environment may be represented in the pose configuration space 112 using an XY grid (e.g., a representing a ground plane), for example, as shown in FIG. 1A. The orientations within the environment may be represented in the pose configuration space 112 using an angular-orientation component $\theta$ (e.g., rotation relative to the x-axis). In at least one embodiment, the pose configuration space 112 may be parameterized as the pose $P=(x, y, \theta)$.

Figure 2:
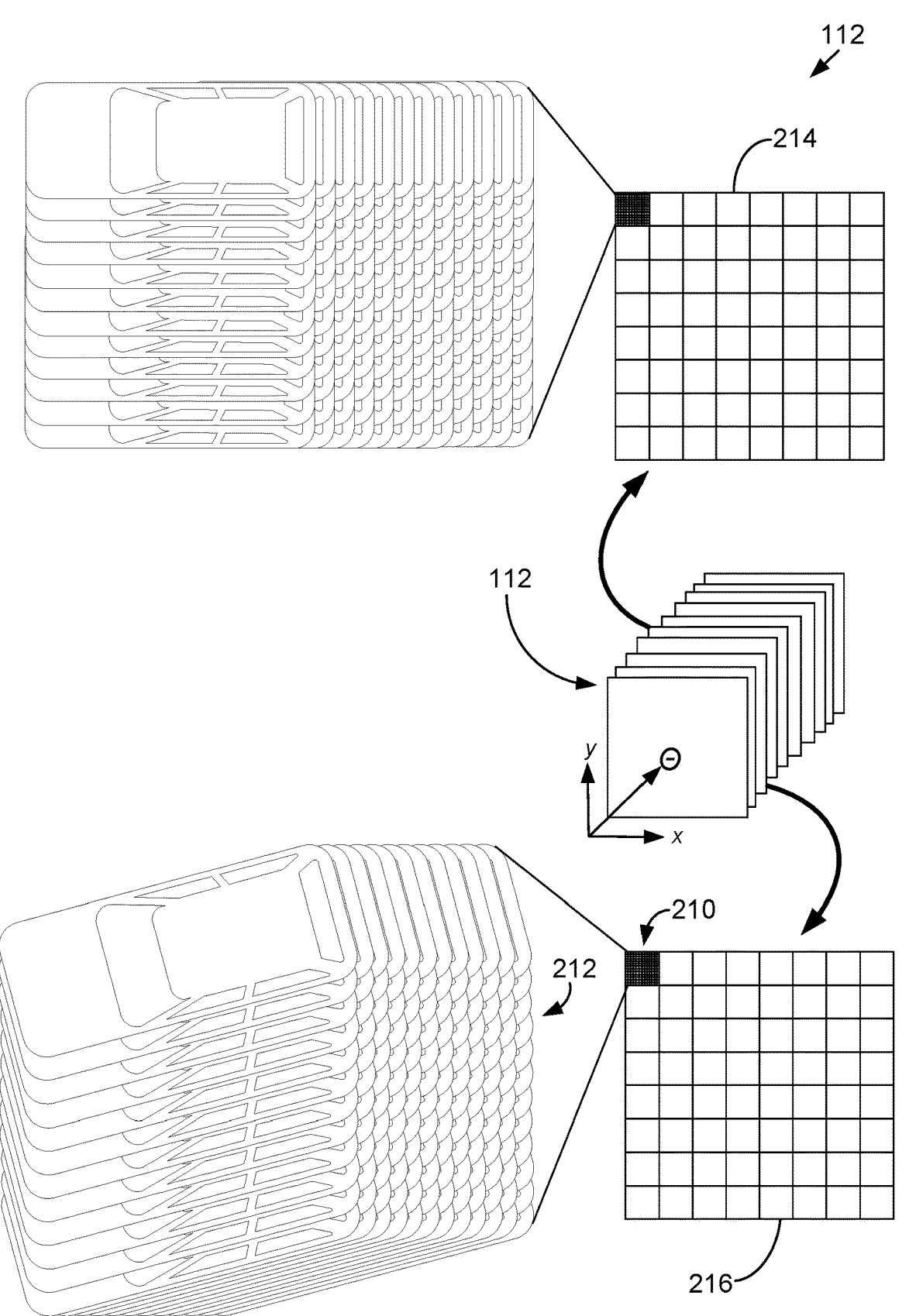
FIG. 2 is an illustration showing an example of a pose configuration space that may be used to model vehicle poses, in accordance with some embodiments of the present disclosure.

FIG. 2 is an illustration showing an example of the pose configuration space 112 that may be used to model vehicle poses, in accordance with some embodiments of the present disclosure. FIG. 2 illustrates an example of how a grid of poses 210—each pose $P=(x, y, \theta)$—stored in the pose configuration space 112 may represent positions 212 of a vehicle in the driving environment. For example, FIG. 2 illustrates that each $\theta$ slice 214 and 216 of the pose configuration space 112 may represent a set of (x, y) values in combination with a respective angular orientation $\theta$.

FIG. 3 illustrates an example of a motion model 300 that may be used to define trajectories of the vehicle through the pose configuration space 112, in accordance with some embodiments of the present disclosure. The poses captured in the pose configuration space 112 may correspond to points on trajectories captured by the motion model 300. In the example shown, the motion model 300 comprises an Ackermann model for motion. Under the motion model 300, a turn may progress as a circular body motion 310 with a center 312 of the turn axially aligned with a rear wheel axle 314 of the vehicle at a distance 316 from a center of a rear wheel axle 318. As indicated in FIG. 3, the center of the rear wheel axle 318 may correspond to the x, y coordinates of a pose in the pose configuration space 112. The distance 316 correspond to the radius of the turn, which may be determined by an angle of front wheels 320 and 322 of the vehicle. As indicated in FIG. 3, the angle of front wheels 320 and 322 of the vehicle may correspond to the $\theta$ coordinate of a pose in the pose configuration space 112.

Various parameters may affect the pose configuration space 112, such as the size of the environment represented by the pose configuration space 112 and the spatial and angular cell size. As such, the configuration space manager 136 may use the parameter controller 138 to define these settings. For example, the parameter controller 138 may receive dimensions of the environment to be evaluated (e.g., 30 m×30 m) and a cell size (e.g., 0.3 m), which may affect the spatial density of the pose configuration space 112 (e.g., the number of cells in the x-axis and in the y-axis). In addition, the angular cell size (e.g., in radians) or number of angular cells may also be provided to the parameter controller 138, which may affect the angular density of the pose configuration space 112 (e.g., the number of layers in the $\theta$-axis). A pose configuration space with more cells in a given space (e.g., due to smaller spatial cell size and/or angular cell size in a given area) may present a larger number of eligible poses and paths for evaluation, and may allow for more precision when targeting a pose.

In at least one embodiment, to determine paths and/or multi-point turns specific to an environment, the occupancy of the pose configuration space 112 may be computed, such as by using the freespace manager 120. That is, the freespace manager 120 may determine which poses in the pose configuration space 112 are perceived as at least partially occupied by an obstacle and which poses are perceived as open or free. The freespace manager 120 may use the object detector 140 to detect and/or identify objects that may occupy or obstruct positions in the environment. The freespace manager 120 may additionally or alternatively receive data representing objects from an object detector 140 operating external to the path planner 110. The freespace manager 120 may use the occupancy evaluator 142 to collision-test a body of the vehicle against the objects. Some dilation of the body of the vehicle and/or objects may be used to provide a margin.

Figure 4:
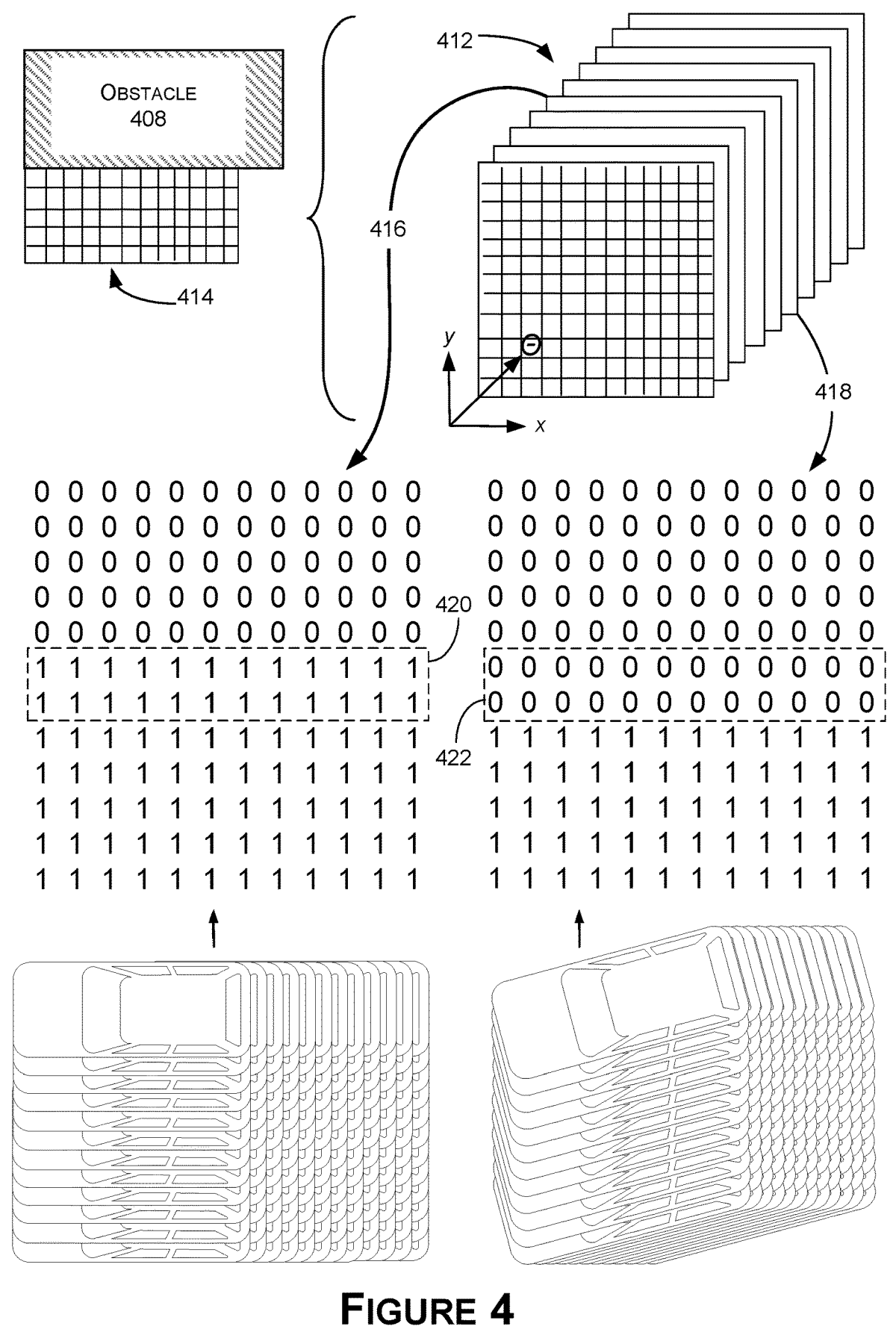

When collision testing, the obstacle and vehicle body representations used as input to the occupancy evaluator 142 may be polygonal or rasterized, and the output may be rasterized. The collision testing may use the center of the vehicle rear wheel axle at (x, y) with a rotation $\theta$ relative to the x-axis. Referring now to FIG. 4, FIG. 4 is an illustration of an example of an occupancy space 412 that captures occupancy of poses in a pose configuration space, in accordance with some embodiments of the present disclosure. In particular, FIG. 4 depicts at least a portion of the occupancy space 412 that may be parameterized similar to the pose configuration space 112 (e.g., using at least x, y, $\theta$). In addition, FIG. 4 depicts an example obstacle 408 that may be perceived and depicts the position of the obstacle 408 relative to a set of (x, y) values 414, which may be consistent across all $\theta$'s. Furthermore, FIG. 4 illustrates example data values for a $\theta$ plane 416 and for a $\theta$ plane 418, each of which may correspond to a respective vehicle angular orientation.

By way of example and not limitation, the occupancy space 412 may store one bit per cell, where a one may represent that the corresponding pose is free, and a zero may represent that the corresponding pose is not free (e.g., is occupied). As indicated in FIG. 4, some of the poses 420 for the $\theta$ plane 416 are set to one and are free based on the angular orientation of the vehicle. However, corresponding poses 422 in the $\theta$ plane 418 are set to zero and are potentially obstructed due to the angle of the vehicle being different and potentially overlapping with the obstacle 408.

In at least one embodiment, the occupancy evaluator 142 may compute occupancy of the poses of the pose configuration space 112 and write results to the occupancy space 412 in parallel. For example, each of the poses may be tested separately (e.g., by a thread) and the results written in parallel (e.g., by the thread) into the occupancy space 412. The data of the occupancy space 412 may be used by the reachability manager 122 for subsequent processing and path identification and evaluation.

With the data from the occupancy space obtained from the freespace manager 120, the path planner 110 may execute an algorithm to find a recommended path from a current pose $(x_c, y_c, \theta_c)$ to a target pose set $(x_{min}, y_{min}, \theta_{min})$, $(x_{max}, y_{max}, \theta_{max})$, given the non-holonomic constraints of the vehicle. Both the current pose and the target pose set may be provided as inputs to the path planner 110 from one or more other motion planners (e.g., when detecting a parking spot, a position allowing a robot to pick up a pallet, etc.).

In at least one embodiment, the path planner 110 may be configured to evaluate one or more pre-determined turn or trajectory types with respect to the current or starting pose in the pose configuration space 112, where a turn or trajectory type may correspond to a given turn radius and a direction (e.g., forwards or backwards). For example, a trajectory type may define multiple trajectories throughout the pose configuration space 112, and the reachability manager 122 may use the reachability evaluator 148 to evaluate all or nearly all of those poses with respect to an initial or current pose. Trajectories that are at least portions of turns are primarily described herein by way of example, but disclosed embodiments may more generally apply to other types of trajectories which may, for example, be built from turn primitives.

In at least one embodiment, the reachability evaluator 148 may determine reachability, for example, with respect to whether the poses within a trajectory can be reached from the current or starting pose C of the vehicle (or a target pose T or other pose in some embodiments). An iterative approach may be employed where the reachability manager 122 evaluates a reachability of a set of trajectories (e.g., of one or more turn types), and uses the results of the evaluation as inputs to evaluate reachability of the set of trajectories (or a different set of trajectories) in a subsequent iteration. For example, a trajectory of a subsequent iteration may be reachable based at least on it being reachable by (e.g., connecting to) at least one trajectory from a prior iteration, and the starting pose being reachable by that at least one trajectory from the prior iteration.

The reachability evaluator 148 may evaluate reachability for any number of trajectory executions (e.g., up to a threshold number of trajectory executions and/or until a target pose is reachable). For example, the reachability manager 122 may evaluate reachability were the vehicle to execute a single turn or a multi-point turn (e.g., up to a threshold number of turns, such as 8 turns) in the pose configuration space 112. In at least one embodiment, the reachability evaluator 148 may also evaluate reachability for trajectories with respect to whether the poses thereof are free (e.g., using determinations from the freespace manager 120). For example, an obstacle in a trajectory may automatically preclude the reachability of any subsequent poses in the trajectory.

The reachability evaluator 148 may also in some embodiments determine and/or record costs associated with reaching poses of the trajectories, for example while evaluating reachability of the poses. As described herein, a cost score may be used as an indicator of reachability, for example, with a 1 or 0 indicating whether or not a pose is reachable, a max cost score indicating unreachable and another cost score indicating reachable, etc. In other examples, the reachability manager 122 may store cost scores separate from reachability indicators. In various embodiments, one or more obstacles may not necessarily result in a pose in a trajectory being found unreachable, but may introduce some cost which may be greater than a cost value were the obstacle not present. Additionally different obstacles may have different cost values.

Figure 5:
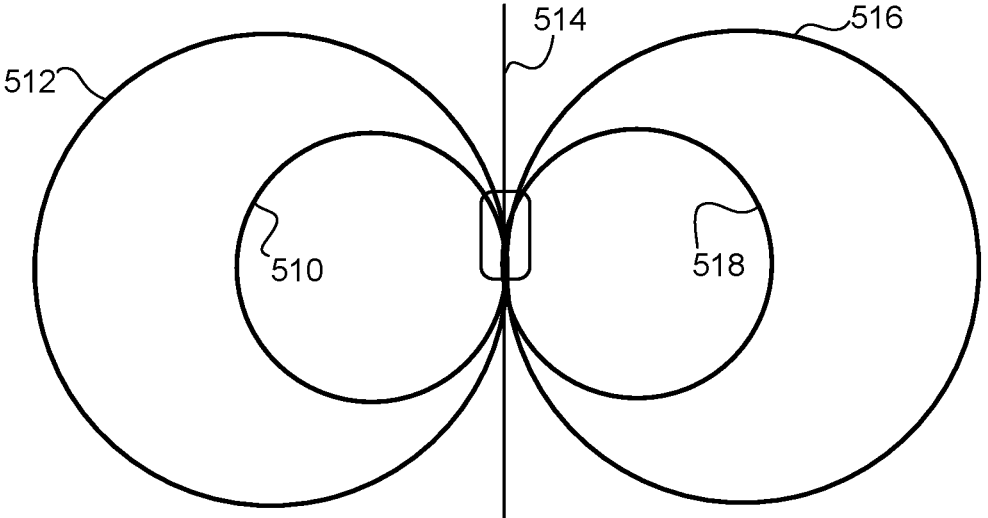
FIG. 5 illustrates examples of turns of different turn types that may be evaluated in a pose configuration space, in accordance with some embodiments of the present disclosure.

As described herein, one or more of the trajectories associated with a pose in the pose configuration space 112 may be a turn, and each "turn" may include the vehicle moving forward or backward for an arbitrary distance while keeping the steering wheel fixed (thereby maintaining the turn radius). For example, FIG. 5 illustrates examples of turns of different turn types that may be evaluated in the pose configuration space 112, including a sharp left 510, a slight left 512, a straight 514 ($\theta$=0), a slight right 516, and a sharp right 518. Each of the different turn types may include a respective turn radius, with left turns denoted as negative (–) and right turns denoted as positive (+). For example, the radius for the sharp left 510 may be –10 m, and the radius for the slight left 512 may be –20 m; whereas the radius for the sharp right 518 may be 10 m and the radius for the slight right 516 may be 20 m.

In at least one embodiment, while progressing through a turn type, the vehicle traces through the trajectory of poses in the pose configuration space 112, which may be defined using Equation (1):

$$P(\theta)=(x_0+qQ\sin\theta, y_0+qQ(\cos\theta-1),\theta) \tag{1}$$

parameterized by $\theta$, where Q is the turn radius, q is the turn direction (e.g., +1 for right when going forward or –1 for left when going forward), and ($x_0$, $y_0$) is the position when $\theta$ is zero.

The reachability evaluator 148 may process through all of the potential turn combinations, including any variations of turn types (e.g., forward, then backward). The reachability manager 122 may update a reachability space 102 after every reachability evaluation iteration with an indication of whether each pose in the pose configuration space 112 is reachable in that particular iteration (e.g., reachable back to the starting pose and not blocked by an obstacle) and/or with a cost of reaching the pose. Progressing through every trajectory at every iteration may represent a significant volume of processing, and in some instances, which may be greatly accelerated by parallel processing.

In at least one embodiment, in order to process trajectories in parallel so as to determine reachability of the poses therein, the reachability evaluator 148 may analyze disjoint trajectories within the pose configuration space 112, allowing for independent processing. In accordance with disclosed embodiments, the disjoint trajectories may comprise a set of trajectories of a common trajectory or turn type (e.g., turn radius and direction). In processing the trajectories or sections thereof (e.g., each by a respective thread), the pose translator 146 of the reachability manager 122 may be configured to determine shifted poses of the pose configuration space 112 based at least on translating the poses of the pose configuration space 112 along at least one axis of the pose configuration space 112 to determine the shifted poses of the disjoint trajectories. The disjoint trajectories (or sections thereof) may be evaluated using parallel processing (e.g., by a respective thread), allowing for the reachability evaluator 148 to rapidly evaluate the reachability of the shifted poses.

Figure 6A:
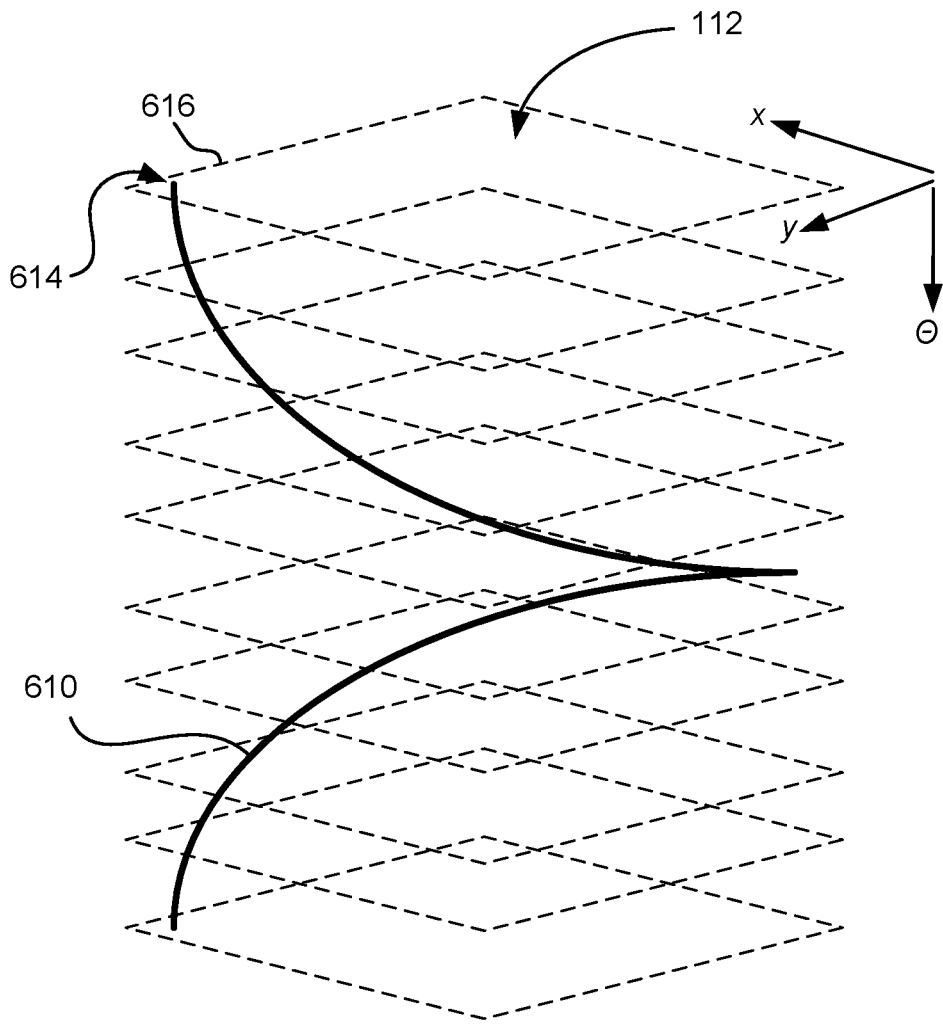
FIG. 6A illustrates an example of a corkscrew of a turn laid out in a pose configuration space, in accordance with some embodiments of the present disclosure.
Figure 6B:
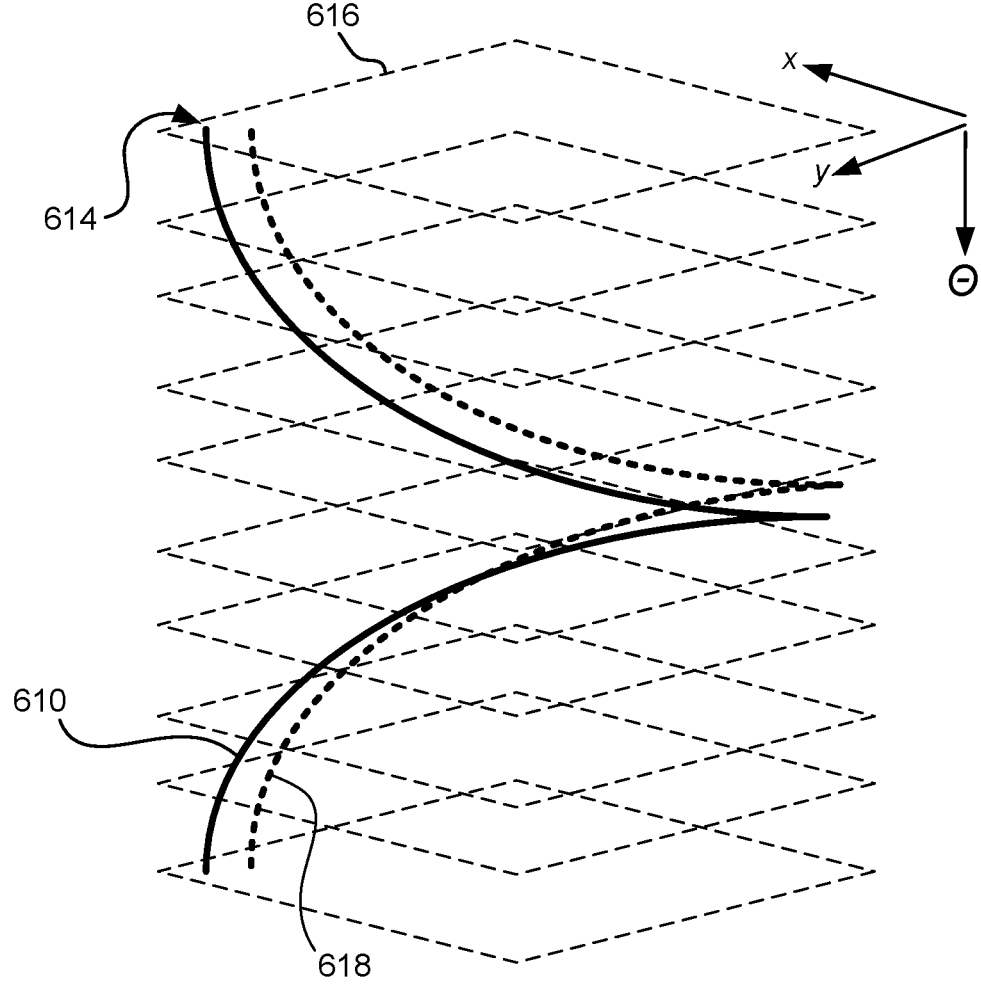
FIG. 6B illustrates an example of the corkscrew of the turn of FIG. 6A along with a corkscrew of another turn that is a translated copy of the turn laid out in the pose configuration space, in accordance with some embodiments of the present disclosure.

FIGS. 6A-6B are used to describe examples of approaches that may be used by the pose translator 146 to translate the poses of the pose configuration space 112. Referring now to FIG. 6A, FIG. 6A illustrates an example of a corkscrew of a turn 610 laid out in the pose configuration space 112, in accordance with some embodiments of the present disclosure. As shown, the turn 610 may conceptually map to a corkscrew in the pose configuration space 112 by tracing through the trajectory of poses defined by Equation (1). That is, as a turn progresses through the space (e.g., tracing the poses defined by the Equation (1)), the turn may progress from current (x, y) coordinates to the next (x, y) coordinates, while also progressing along the $\theta$-axis through $\theta$ planes, such as $\theta$ plane 616. In other words, all of the x, y, and $\theta$ coordinates may be changing throughout the turn in the corkscrew manner indicated in FIG. 6A.

In the pose configuration space 112, each turn having the same turn radius and initial orientation (the same turn type) may be a translated copy of each other turn, but with a different starting point (x, y), stemming from the fact that the vehicle may behave the same way regardless of where it is initially positioned. For example, FIG. 6A illustrates the turn 610 associated with a fixed turn radius and starting at (x, y) coordinates 614 in $\theta$ plane 616. Each of the other turns having the same turn radius—but starting at different (x, y) coordinates in $\theta$ plane 616—may be a translated copy of the turn 610 in the pose configuration space 112. For example, referring to FIG. 6B, FIG. 6B illustrates an example of a corkscrew of the turn 610 of FIG. 6A along with a corkscrew of a turn 612 that is a translated copy of the turn 618 laid out in the pose configuration space 112, in accordance with some embodiments of the present disclosure. The turns having the same turn radius may have translative parallelism, which may be exploited for parallel processing using the pose translator 146. While turns are described, other types of trajectories and/or sections thereof may also have translative parallelism, which may similarly be exploited for parallel processing as described herein.

In at least one embodiment, the pose translator 146 may translatively shift the poses of the pose configuration space 112 along at least one axis (e.g., the $\theta$-axis) and the reachability evaluator 148 may process each of the poses along the at least one axis in parallel to assess reachability (e.g., with one thread per turn, or section thereof). For example, the parallelism of turn types may be exposed by the pose translator 146 performing a translative shift that makes the set of corkscrews in the pose configuration space 112 that correspond to the same turn radius a bundle of parallel lines along the $\theta$-axis. The parallel lines may be proceed through the pose configuration space 112 in parallel as disjoint trajectories, allowing for independent processing thereof.

Figure 6C:
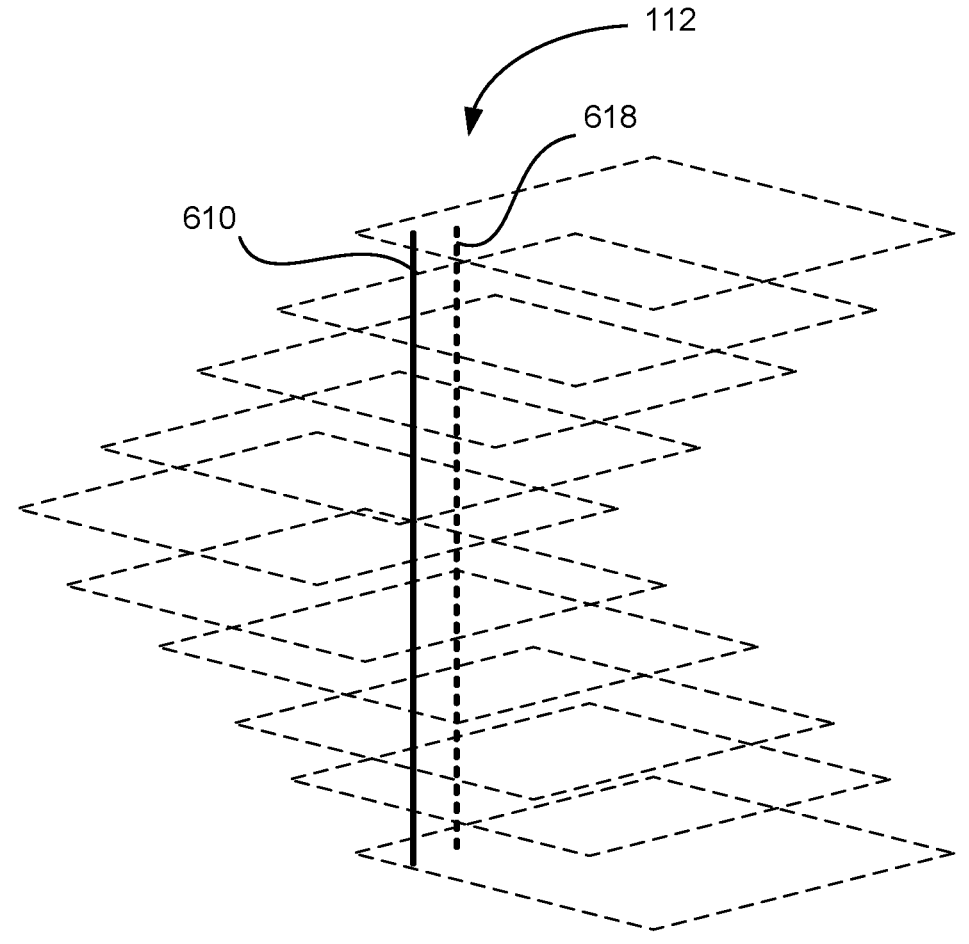
FIG. 6C illustrates an example of shifted trajectories formed by translating the corkscrews of FIG. 6B, in accordance with some embodiments of the present disclosure.

In at least one embodiment, for a given turn radius and direction (a turn type), the pose translator 146 may perform a translative shift defined by Equation (2):

$$t(\theta)=(t_x(\theta), t_y(\theta))=(qQ\sin\theta, qQ(\cos\theta-1)) \tag{2}$$

as a function of $\theta$ and apply the transformation (e.g., using a warp) defined by Equation (3):

$$(x,y,\theta)\rightarrow(x-t_x(\theta), y-t_y(\theta),\theta) \tag{3}$$

to the pose configuration space 112. This may amount to a translative shift of each constant $\theta$ plane of the pose configuration space 112. The transformed version of the turn trajectories of a turn type may be defined by Equation (4):

$$P(\theta)=(x_1, y_0,\theta) \tag{4}$$

which is a set of lines parallel to each other and to the $\theta$-axis. For example, referring to FIG. 6C, FIG. 6C illustrates an example of shifted trajectories formed by translating the corkscrews of FIG. 6B, in accordance with some embodiments of the present disclosure. In particular, FIG. 6C conceptually illustrates the pose configuration space 112 along with the turns 610 and 618 as translated or shifted by the pose translator 146. As shown, the turns 610 and 618 (e.g., having the same turn radius and direction) are now parallel lines along the θ-axis and may be processed as such. This transformation may be possible because the trajectories are translation invariant with respect to translation along x and y in the sense that the operations of following the turn curve and translating commute. The trajectories of the turn type may be considered translated copies of each other and have the same shape regardless of the starting point $(x_0, y_0)$ coordinates. The parallelism along the θ-axis contributes to the massive parallelism of the path planner 110 in a way that is suitable for a modern parallel processor. Optionally the data may be transposed to switch the θ-axis and the x-axis so that the trajectories are always parallel to the x-axis (or θ-axis).

In one or more embodiments, the pose translator 146 may transform the pose configuration space 112 (e.g., virtually by access pattern or actually by copying data around) for each turn type (e.g., same radius and direction) so that the turn curves of that turn type form the parallel lines. The reachability evaluator 148 and/or other system components may then process through each of the lines in parallel. The processing may run parallel to the θ-axis along each of the parallel lines as selected by $(x_0, y_0)$ while accessing the original pose configuration space according to Equation (5):

$$(x_0+t_x(\theta),y_0+t_y(\theta),\theta) \tag{5}$$

which may be given by the inverse of the transformation defined above. This transformation may be easily invertible, and therefore bijective. It may be desirable for this bijective property to persist when using a discretized implementation of the transformation. For example, by having a bijective transformation, complete parallel separation may be maintained between the threads processing individual trajectories (or sections thereof), without having to resort to atomic operations or worrying about read or write race conditions. This may also enhance the ability for each cell in the discretized pose configuration space to be tended to by one of the threads in processing a turn type. The bijective property may be achieved, for example, by quantizing $t(\theta)$ the same way within each constant θ plane. The transformation of the pose configuration space 112 performed by the pose translator 246 may then be a translative shift of each constant θ plane, regarded as an image, by an integer number of pixels. This may be ideally suited for parallel implementations as the shifted memory access may be done on-the-fly while doing the processing, thereby reducing memory access which may be a limiting factor. In addition, the difference in translative shifts in successive planes may be reduced (e.g., to not differ by more than one pixel or some other threshold value) to avoid large jumps along the discretized trajectory processing. This may be achieved by having sufficient angular resolution of the pose configuration space 112.

Figure 7:
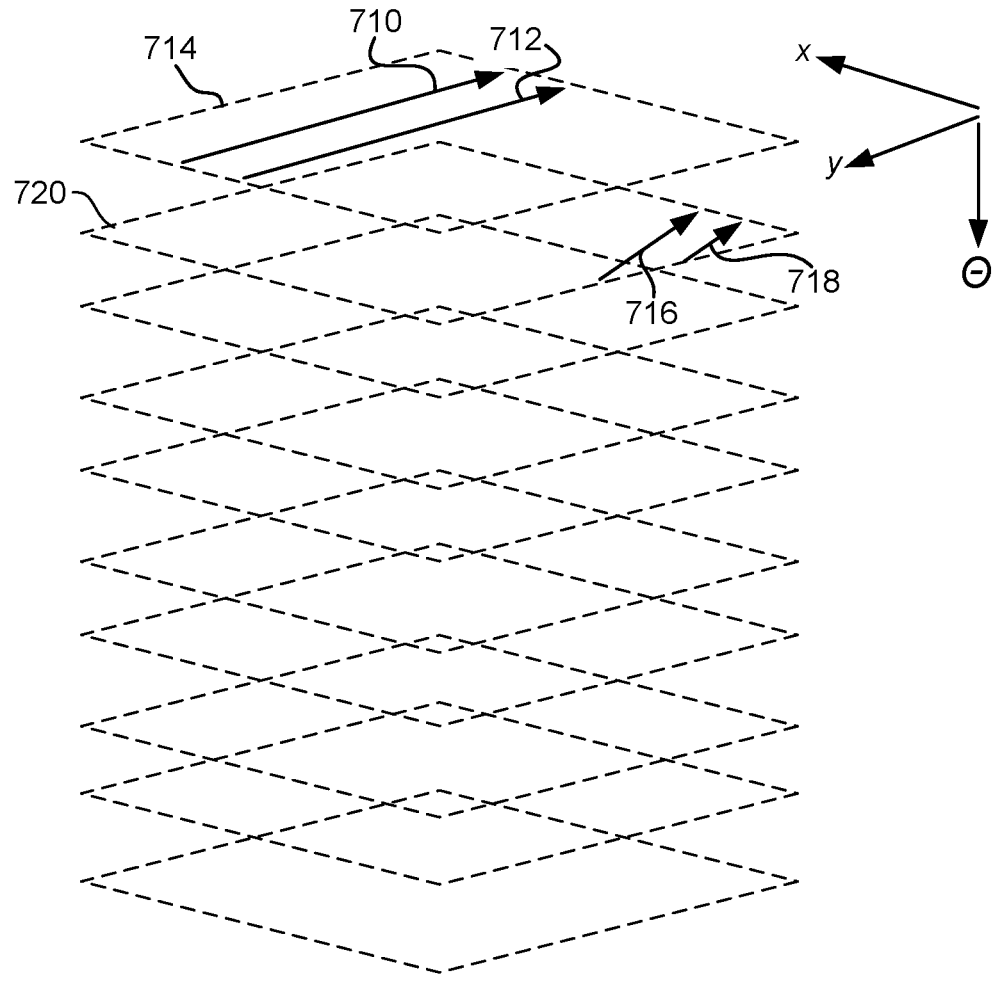
FIG. 7 is an illustration of how straight driving paths may conceptually map to a pose configuration space, in accordance with some embodiments of the present disclosure.

When assessing reachability, the path planner 110 may evaluate curved turns, as well as straight maneuvering (e.g., turns having an infinite turn radius). When traversing through a trajectory of poses along a straight path, the poses may be defined using Equation (6):

$$P(u)=(x_0+u \cos \theta,y_0+u \sin \theta,\theta) \tag{5}$$

parameterized by u, where θ is the now constant heading angle and $(x_0, y_0)$ is the starting position when u is zero. In the pose configuration space 112, the trajectories may be represented as lines at angle θ in each θ plane. For example, FIG. 7 illustrates trajectories 710 and 712 starting at respective (x, y) coordinates and both oriented according to the θ associated with a θ plane 714. In addition, FIG. 7 illustrates trajectories 716 and 718, which start at respective (x, y) and are both oriented according to a different θ associated with a θ plane 720.

A transformation (e.g., by the pose translator 146) of the straight case into parallel lines aligned with one of the coordinate axes may be accomplished in various manners. For example, in at least one embodiment, each θ plane could be rotated by the angle −θ, and as a continuous transformation, this approach is bijective. For example, warps of work may be defined where each warp is to rotate each constant θ plane independently around its center by the angle −θ so that all straight lines driven line up parallel to the x-axis. This approach may be efficient in a GPU because the warps are of each constant θ plane that is an image rotation which may be accomplished using interpolation method 'nearest' (e.g., to preserve the integrity of the integers in the space that is warped). The rotation may rotate some corners outside the original space, which may be accounted for by using a padded version of the space. All cells that are outside of the original space may be treated as never reachable and disallowed as if by obstacles or high cost.

A discretized image rotation may not easily preserve a bijective transformation property, although a bijective image rotation may be achieved by three shearing coordinate transformations. In an alternative aspect, a single shearing transformation may be applied per θ plane, which may produce less discretization noise and may provide the ability to perform the transformation on-the-fly while processing via simple translative shifts of the memory access vector operations. By way of example, when the direction of the lines is closer to the x-axis direction than the y-axis direction ($|\tan \theta| \le 1$) or some other threshold value, the pose translator 146 may shear the trajectories to become parallel with the x-axis, and otherwise with the y-axis. In the former case (e.g., closer to the x-axis), the pose translator 146 may set $x_0=0$, and in the latter (e.g., closer to the y-axis), the pose translator 146 may set $y_0=0$ and still consider all lines. These operations may result in the trajectory family defined by Equation (6):

$$P(u) = \begin{cases} (u \cos \theta, \ y_0 + u \sin\theta, \ \theta), \ |\tan\theta| \le 1 \\ (x_0 + u \cos \theta, \ u \sin\theta, \ \theta), \ |\tan\theta| > 1 \end{cases}, \tag{6}$$

which may also be written as Equation (7):

$$\begin{cases} P(x) = (x, \ y_0 + x \tan \theta, \ \theta), \ |\tan\theta| \le 1 \\ P(y) = \left(x_0 - y\tan\left(\theta + \frac{\pi}{2}\right), \ y, \ \theta\right), \ |\tan\theta| > 1 \end{cases}, \tag{7}$$

The bijective shearing transformation may then be defined by Equation (8):

$$(x, \ y, \ \theta) \to \begin{cases} (x, \ y - x \tan\theta, \ \theta), \ |\tan\theta| \le 1 \\ \left(x + y\tan\left(\theta + \frac{\pi}{2}\right), \ y, \ \theta\right), \ |\tan\theta| > 1 \end{cases}. \tag{8}$$

After this transformation, the trajectories may take the form of Equation (9):

$$\begin{cases} P(x) = (x, y_0, \theta), & |\tan\theta| \le 1 \\ P(y) = (x_0, y, \theta), & |\tan\theta| > 1 \end{cases} \quad (9)$$

which is a set of lines parallel either with the x-axis or y-axis. Similar to the curved turn case, the reachability evaluator 148 may run the processing along these lines while accessing the original pose configuration space according to Equation (10):

$$\begin{cases} (x, y + x\tan\theta, \theta), & |\tan\theta| \le 1 \\ \left(x - y\tan\left(\theta + \dfrac{\pi}{2}\right), y, \theta\right), & |\tan\theta| > 1 \end{cases} \quad (10)$$

which may be given by the inverse of the shearing transformation.

As described herein, an iterative approach may be employed where the reachability manager 122 evaluates reachability of a set of trajectories (e.g., of one or more turn types), and uses the results of the evaluation as inputs to evaluate reachability of the set of trajectories (or a different set of trajectories) in a subsequent iteration. To this effect, the reachability evaluator 148 may be used to determine whether a pose in the pose configuration space 112 (e.g., as transformed by the pose translator 146) is reachable from a current position by processing one or more trajectories in an iteration, then performing one or more subsequent iterations (e.g., up to a given maximum number of turns) to determine if the pose becomes reachable in a subsequent iteration. For example, the reachability evaluator 148 may evaluate whether a pose is reachable based on determining whether the pose is blocked or occupied (e.g., using the occupancy space 412) and included in one or more trajectories (e.g., 510, 512, 514, 516, 518, etc.) of an iteration.

In at least one embodiment, the reachability evaluator 148 may begin at a current or starting pose $(x_c, y_c, \theta_c)$ with only that pose being marked as reachable. In a first iteration, the reachability evaluator 148 may annotate a reachability space(s) 102 for the first iteration to indicate (e.g., mark) whether each pose is reachable from the current pose using the trajectories (e.g., along a turn trajectory of at least one of the trajectories and not blocked from the current pose by an obstacle) in the first iteration. For example, the reachability evaluator 148 may evaluate reachability with respect to each turn type. This may result in a reachability space 102 that indicates a set of reachable poses after the first iteration. In a second iteration, the reachability evaluator 148 may annotate a different reachability space(s) 102 (or the same reachability space(s) 120 in some embodiments) for the second iteration to indicate (e.g., mark) whether each pose is reachable from the current pose using the trajectories in the second iteration (e.g., for each turn type and/or different turn types). Iterations may similarly continue until the reachability evaluator 148 has reached a maximum number of iterations (e.g., 8 turns), discovered a target pose, and/or determined some other ending condition is satisfied. The path evaluator 130 may use the reachability space(s) 102 as annotated to identify which path, if any, is recommended based on a cost function (e.g., shortest number of turns, shortest distance, or other cost assessment) or other approach.

The reachability evaluator 148 may process the pose configuration space 112 in various manners as it progresses through an iteration. In at least on embodiment, the reachability evaluator 148 may reference the occupancy space 112 parameterized by (x, y, θ) and a separate reachability space 102 also parameterized by (x, y, θ) for each trajectory type (e.g., a reachability space 102 for sharp left forward driving, a reachability space 102 for sharp left reverse driving, a reachability space 102 for straight forward driving, etc.). In addition, each cell correlating with a single pose (x, y, θ) may be updated in a corresponding reachability space 102 as the reachability evaluator 148 evaluates whether the respective pose is free and reachable in the iteration.

Figure 8:
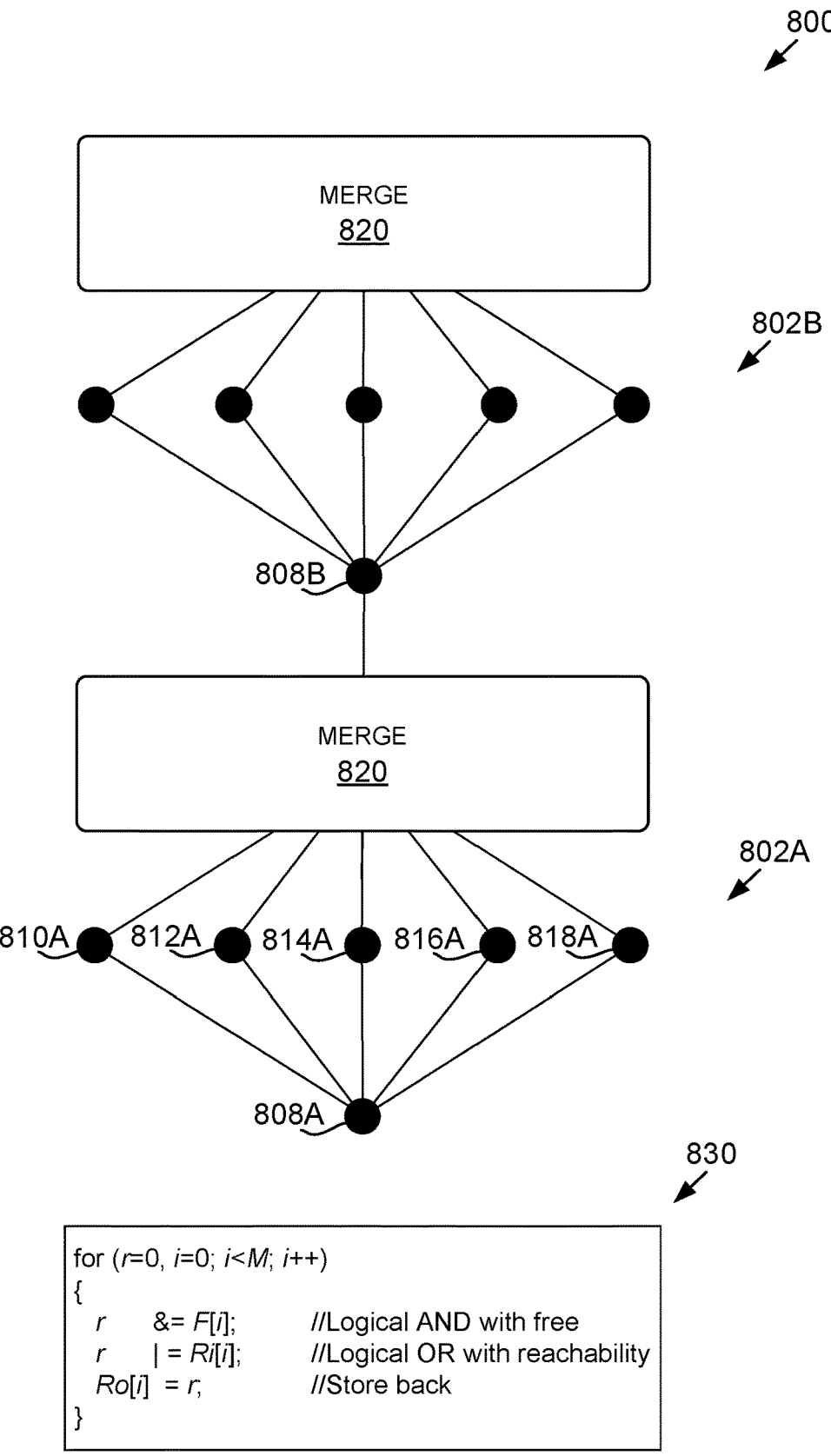
FIG. 8 illustrates an example of a compute flow graph which may be used to process turns in which reachability is encoded using a binary value, in accordance with some embodiments of the present disclosure.

Referring now to FIG. 8, FIG. 8 illustrates an example of a compute flow graph 800 which may be used to process turns in which reachability is encoded using a binary value, in accordance with some embodiments of the present disclosure. The compute flow graph 800 may be suitable for embodiments where a binary value is used to store whether a pose is reachable or not reachable. In one or more embodiments, for each iteration, the reachability evaluator 148 may start with a shared reachability space and process, in parallel, each turn type to compute a corresponding reachability space. For example, for the iteration 802A, the reachability evaluator 148 may start with a reachability space 808A and process, in parallel, a sharp left turn type to generate a reachability space 810A, a sharp left turn type to generate a reachability space 810A, a slight left turn type to generate a reachability space 812A, a straight turn type to generate a reachability space 814A, a slight right turn type to generate a reachability space 816A, and a sharp right turn type to generate a reachability space 818A. Although not shown, turn types for both forward and reverse may be processed.

Each iteration may also include the reachability evaluator 148 merging the reachability spaces for the turn types to provide the shared reachability space for a subsequent iteration. For example, the iteration 802A may include the reachability evaluator 148 performing a merge 820A on the reachability spaces 810A, 812a, 814A, 816A, and 818A generate a reachability space 808B as an input to an iteration 802B. In one or more embodiments, the merge 820A may comprise a logical OR operation. A logical OR may be suitable to reflect that the reachability spaces may capture various different ways to reach particular cells, each of which may be valid. In at least one embodiment, the shared reachability space may be cached in shared memory (e.g., of a GPU) accessed by each thread.

In an aspect of the present disclosure, the reachability evaluator 148 propagates reachability along an entire turn trajectory, such that every pose that is along the turn trajectory of the single reachable pose (e.g., shaded boxes in FIG. 9) and that is not separated from the single reachable pose by an obstacle is marked as reachable. To determine which one or more poses from a previous iteration are reachable, the path planner progresses through every single turn having the turn radius and direction, and because the translative shift has been applied, this can be executed in parallel. At each pose (x, y, θ), the path planner turns off reachability if it finds an obstacle (e.g., based on occupancy space) and turns on reachability when reachability from a previous iteration is found.

Thus, to process through an iteration, the reachability evaluator 148 may turn a reachability space from a previous iteration into a reachability space after the iteration. In at least one embodiment, the reachability evaluator 148 may apply a rule that if a pose on a trajectory (e.g., a particular turn of a turn type) being processed was reachable previously (as indicated by the reachability space), then all of the poses along the trajectory that are not separated from any of the previously reachable points by an obstacle will be reachable. In this way, reachability may propagate along the trajectory until stopped by an obstacle.

FIG. 8 includes pseudocode 830 to illustrate how a thread of the reachability evaluator 148 may process through M pose cells of a trajectory using a core loop that turns off for a pose cell i, reachability represented by a local variable r when the thread finds an obstacle as represented by an element of an occupancy space input F, and turns on for the pose cell i, reachability when the thread finds reachability from a previous iteration as represented by a reachability space input Ri, then writes out the reachability r to a reachability space output Ro. As described herein, the pose translator 146 may be used to shift the poses in advance or on-the-fly for the processing.

In one or more embodiments, all of the variables r, F, Ri, Ro may be processed as bit vectors. For example, if the variables are declared as 32 bit unsigned integers, 32 bits and therefore 32 parallel trajectories may be processed in parallel as bit vectors. The processing may not include any conditional processing or branches—just a logical AND operation to stop propagation when freespace stops and a logical OR operation to start or restart propagation when reachability from the previous iteration is indicated in the input. In addition, the processing of this core loop may flow in parallel and exact synchronization between many threads, each responsible for one trajectory, so that the threads are effectively performing large vector operations in synchronization.

Thus, this approach may be suitable for a modern parallel processor, which thrives on large vector operations well aligned in memory in a Simultaneous Instruction Multiple Thread (SIMT) manner, similar to but distinct from Simultaneous Instruction Multiple Data (SIMD). For example, some parallel processing architectures may include a basic unit of parallel processing, such as a warp or wavefront of 32 threads (by way of example), that strive to execute at the same time to drive efficiency. Where a warp is mentioned herein, it may more generally be referred to as a basic unit of parallel processing. Each streaming multiprocessor may process one or more basic units concurrently and there may be many multiprocessors. A single thread may handle 32 trajectories (e.g., turns) simultaneously as a bit vector, such that each basic unit (e.g., warp) may handle 32×32=1024 trajectories in parallel. Furthermore, there may be eight or more multiprocessors, each handling many basic units concurrently to achieve parallelism into the tens of thousands. By allowing for every trajectory (e.g., turn) to be evaluated in each iteration, the path planner 110 is capable of doing all the work as opposed to applying a heuristic to hopefully start down a promising path. Thus, the path planner 110 may avoid recommendations arising from inapplicable heuristics that try to limit operations to the best work first.

The path planner 110 may proceed through one or more iterations and the path evaluator 130 may use the results of the one or more iterations to identify and/or recommend at least one path for use in maneuvering the vehicle to the target pose. To this effect, the output reachability spaces from each of the iterations may be maintained to support a back-trace, as described herein. Since the reachability spaces may only need one bit per cell, this may only require N bits per cell in the pose configuration space. With a reasonable number of iterations, this is no more than what would have been used by representing the spaces by an 8, 16 or 32 bit integer or float.

To identify and/or select a path, the path evaluator 130 may include the trajectory assessor 150 that evaluates one or more costs associated with trajectories (e.g., turns), and there are many cost functions with varied complexity that may be applied to identify a recommended path. One simpler cost function may consider the number of trajectories (e.g., turns) required to get to a certain pose and rank paths higher that reach the pose in fewer trajectories. A more complex cost function may consider how many resources might be expended to follow a path. For example, the trajectory assessor 150 may apply a cost function modeling the amount of time taken to traverse a trajectory, which may include a penalty for changing from forward to reverse or back and assess some time spent traversing through a trajectory depending on its distance. In an even more complex example, a state space may be used by adding turn curvature and sign (the underlying state may be steering and road wheel position and gear) as well as velocity. This may allow modeling costs associated with needing to slow down to a stop when changing into reverse, or making big changes to the steering wheel position.

The trajectory assessor 150 may apply various of different costs models depending on the goals and application of the path planner 110. For example, one cost model may remove an explicit velocity component, and instead, have a cost that depends, at least in part, on the distance traveled through a turn, with a penalty for changing turn type (including changing into reverse) that depends on the type of turn before and after the switch. This approach approximates the understanding that turns are traversed at some fixed low velocity that may be relatively quickly reached, and that changes between turn types incurs an additional penalty for having to slow down to move the steering wheel and/or to change gear. This cost model may be handled by having one reachability space 102 in the form of a cost volume parameterized by $(x, y, \theta)$ for each turn type (e.g., including turn radius and gear—forward/reverse), which holds the lowest cost taken to reach that pose state with the corresponding turn type as the last turn. This model may essentially work with a four-dimensional state space, where the fourth dimension holds the possible turn radii times the two gears.

The path planner 110 may proceed through the update steps that perform one turn at a time, updating the state space from having considered all paths up to n turns to having considered n+1. For each turn type used for the $(n+1)^{th}$ turn, the trajectory assessor 150 may consider starting from any of the other turn types and first pay the cost of the transition. The smallest of those possibilities may be considered the lowest cost of being ready to start a turn of this type from this pose, and the path planner 110 may only have to consider the most efficient. Then the path planner 110 may process through the turn to reach the lowest cost after finishing the $(n+1)^{th}$ turn with this turn type. In one example, processing through N turns with K turn radii may require processing 2NK turns (e.g., assuming reverse requires a separate processing step). As such, before each turn the trajectory assessor 150 may find the minimum of transitioning from 2K cost volumes to begin the turn. In an aspect of the disclosure, this step may be done for all 2K turn types at the same time, reading the 2K volumes, computing the $(2K)^2$ transitions, finding the 2K minima and writing back to the volumes concurrently. This processing upgrades the costs from 'post'-turn to 'pre'-turn for the next turn with 4NK volumes worth of memory access. Each turn may also read the cost back in, read the freespace and write out the new cost, resulting in 6NK additional memory accesses of the volume. This approach may result in a total of 10NK accesses of the volume.

The cost function may be further simplified, for example, by valuing the transition cost between turn types may be valued the same regardless of which types of turns are involved in the transition. In addition, the cost model may assume that the cost of traversing through a turn is negligible in comparison to the transition cost. Under this approach, the cost may be assessed based on the number of turns. Although this approach may greatly simplify operations and not account for some situations (e.g., two short turns with a transition taking less time than one long turn, or where transitioning between two turns of similar radius in the same gear is faster than a large change in the steering or a change of gear), this cost model may still provide a reasonable heuristic. Under this simpler model, a three-dimensional state space may be used instead of a four-dimensional state space. A single state volume may now hold whether a corresponding pose could be reached or not with n turns, which is the same or similar to the approach reflected by the pseudocode 830. With this simpler cost model, the processing of each turn may be read from a common previous cost volume, since the transition penalty is always paid so there is no need to remember which turn type was the last one. The occupancy space is still read, and the new cost is written out for the first turn type and combined by logical OR with the previous results for the following turn types, which incurs a read and a write. This indicates a total of 8NK-2N volumes of memory access. In addition, the cost volume may be represented with a single bit per cell (reachable or not), instead of 8, 16 or even 32 bits depending on the resolution of the cost function. Processing speed of many modern kernels is largely determined by the amount of memory access, and this approach may have a low amount of memory access.

Figure 9:
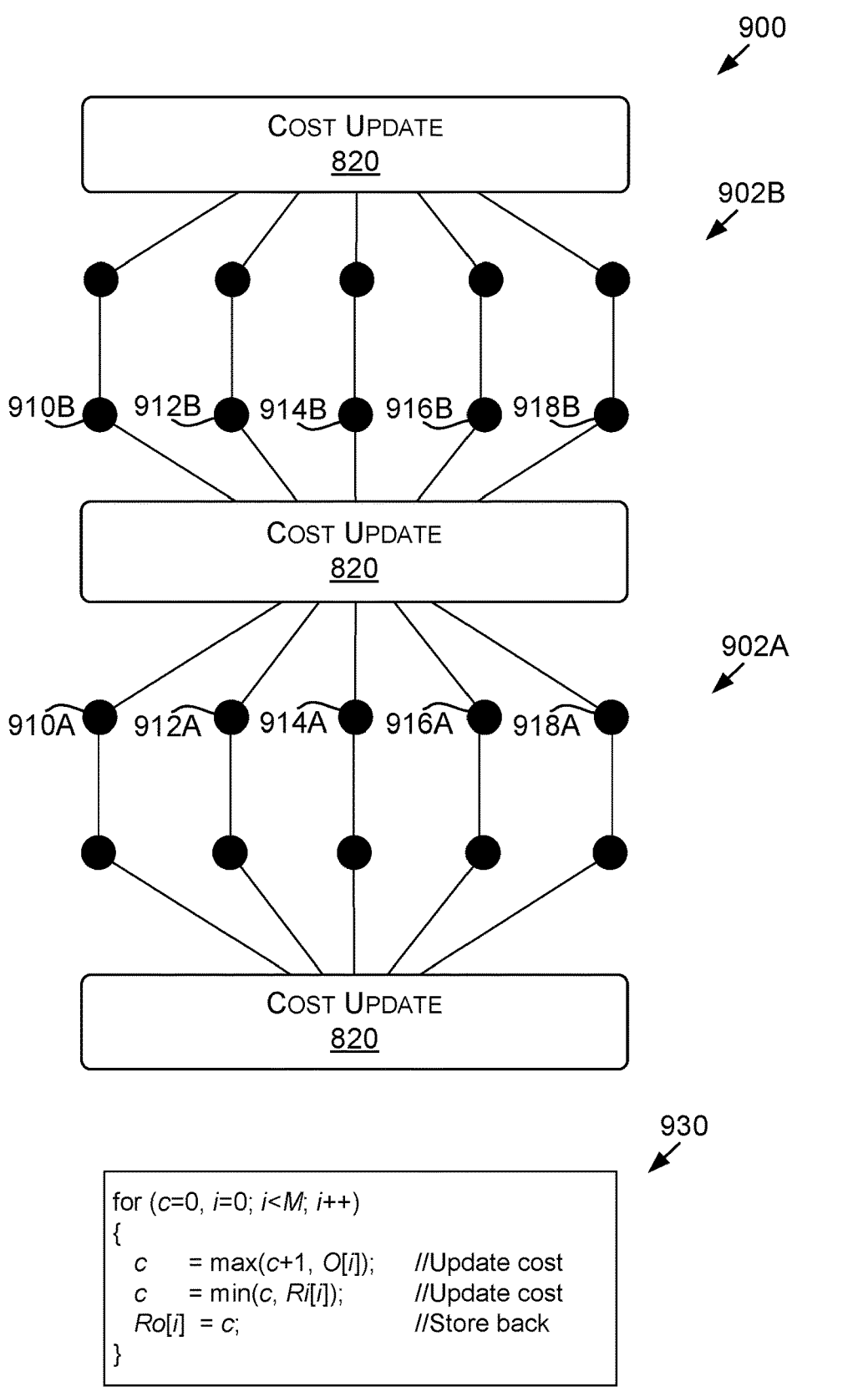
FIG. 9 illustrates an example of a compute flow graph which may be used to process turns in which reachability is encoded using a non-binary value, in accordance with some embodiments of the present disclosure.

Referring now to FIG. 9, FIG. 9 illustrates an example of a compute flow graph 900 which may be used to process turns in which reachability is encoded using a non-binary value, in accordance with some embodiments of the present disclosure. The compute flow graph 900 may be suitable where the reachability evaluator 148 uses a more general cost function than the compute flow graph 800 of FIG. 8.

Similar to the compute flow graph 800, the compute flow graph 900 may proceed through N iterations, such as an iteration 902A and an iteration 902B, each time considering K trajectory types (e.g., sharp left, slight left, straight, slight right, sharp right, etc.). Rather than using a shared reachability space, each iteration may include a cost update of post-trajectory cost outputs from the previous iteration to generate pre-trajectory costs for the iteration. For example, the iteration 802B may include a cost update 820 of post-trajectory cost output spaces 910A, 912A, 914A, 916A, and 918A from the iteration 902A to generate pre-trajectory cost output spaces 910B, 912B, 914B, 916B, and 918B for the iteration 902B. In one or more embodiments, a post-trajectory cost may represent the lowest cost of reaching a pose ending with the corresponding trajectory type and a pre-trajectory cost may represent the lowest cost of reaching the pose and being ready without penalty for the corresponding turn trajectory. The core turn processing of an iteration may then turn the pre-trajectory costs into post-trajectory costs and the process may be repeated. For example, the iteration 902B may include converting the pre-trajectory cost output spaces 910B, 912B, 914B, 916B, and 918B into corresponding post-trajectory cost output spaces, as shown. In FIG. 9, each vertical line indicates evaluation of one trajectory type.

FIG. 9 includes pseudocode 930 to illustrate how a thread of the reachability evaluator 148 may process through M pose cells of a trajectory using a core loop that works with a more general cost function than the pseudocode 830, which involves a cost c. Here, the variables are no longer bit vectors in order to capture non-binary cost values. Also, the logical operations are replaced by max/min operations. Obstacles may be represented by some maximum cost that cannot change, or may be proportionate to the magnitude of the obstacle (e.g., where obstacles do not necessarily block the vehicle). Additionally, cost may increase by one for every step.

In one or more embodiments, an iteration may process each trajectory both in a forward direction and in a reverse direction. If it is cyclical, which is the case for turns unless it is straight, then it also may be processed for two cycles. This is because it is not trivial a priori to know where to start a cycle and a worst case is that reachability from the last cell may need to be propagated through an entire second cycle, although certain heuristics could be developed to account for this. Thus, the trajectories may be processed with four sweeps using code that does not have any long running branching differences between threads in order to avoid thread divergence that hampers parallelism. However, much of this processing may be avoided, while at the same time exposing even more parallelism by splitting each trajectory up into any number of sections that can be processed in parallel.

Using disclosed approaches for splitting a trajectory up into sections that can be processed in parallel can avoid much of the cost incurred by running through cyclical turns forward and backward and through two cycles. In one or more embodiments, the reachability manager 122 splits the processing of one or more trajectories into independent parallel sections. The results may not be completely independent between sections of a turn since reachability may ripple through the entire trajectory for two cycles, both forward and backward. Disclosed approaches may handle this dependency using a parallel reduction pattern that gathers the results hierarchically, performs some small amount of processing with the gathered results, and then scatters the results back out again as inputs to individual sections.

The results of one section may be independent of other sections except for reachability that enters a section at its beginning (or at the end when processing in the backward direction). Disclosed approaches may make compute forward and/or backward reachability that enters a section at its beginning or end, allowing for independent processing of the sections using those inputs. For small sections, the input occupancy space and reachability space may be loaded once and both the forward and backward passes may be processed at the same time, thereby cutting global memory accesses in half. This may be desirable as holding the data in local registers or shared memory close to the processing cores is typically much faster than access to global memory.

To determine the forward and backward reachability that enters each section, a processing pass may be performed that calculates per section (e.g., in parallel) forward reachability leaving section in the forward direction, as originated within the section (SRf), backward reachability leaving section in the backward direction, as originated within the section (SRb), and section freespace, meaning whether the section is entirely made up of freespace (SF).

The section-based forward and backward reachability coming out of this sweep is reachability originated within the section. It may not be possible to locally detect reachability propagated from outside the section, for example, reachability that enters at the beginning of the section and passes through entirely because the section is entirely made up of freespace. This may be accounted for by computing section freespace, allowing for those globally propagated effects to be determined in a much smaller processing sweep that works with sections instead of individual cells.

An example of pseudocode for the processing pass follows, which omits a backward pass that is intermingled with the forward:

```
for (r=0, f=(~0), i=0; i<m; i++)
{
    t          = F[i];        //Load free
    f          &= t;          //Logical AND with free
    r          &= t;          //Logical AND with free
    r          |= Ri[i];      //Logical OR with reach
}
SRf[s]=r; SF[s]=f; //Store section output
``` where m represents the section length and s is an index for one section.

Another processing pass may be used that works with sections similar to the processing pass within sections, but uses section reachability and section freespace instead. This processing pay may loop over the section outputs twice (in the case of cyclic turns). The first loop may warm up the reachability that might be propagated. The second loop may complete the full propagation for cyclic turns and write the result back. An example of pseudocode for the processing pass follows, which only shows the forward pass, as the backward pass is completely analogous:

```
for (r=0, s=0; s<M/m; s++)
{
    r   &= SF[s];             //Logical AND
    r   |= SRf[s];            //Logical OR
}
for (s=0; s<M/m; s++)
{
    r   &= SF[s];             //Logical AND
    r   |= SRA[s];            //Logical OR
    SRf[s] = r;               //Store back
}.
```

While this processing is passing over the section outputs four times (e.g., in parallel), there is only a total of 4/m times as much work in this step, which decreases with longer sections (choice of larger m).

Another processing pass of section processing may be nearly identical to the basic loop with the change that it uses section reachability as input instead of starting reachability at zero. An example of pseudocode for the processing pass follows, which omits a backward pass:

```
for (r=SRf[ (s−1) % (M/m)]; i=0; i<m; i++)
{
    r   &= F[i];              //Logical AND with free
    r   |= Ri[i];             //Logical OR with reach
    Ro[i] = r;                //Store back
}
```

The processing pass of writing the result back may be changed to a logical OR with what is already there for all but the first turn type. Section processing with the more general cost function works analogously, except that reachability r may correspond to the lowest cost leaving or entering a section.

Using a parallel reduction pattern, such as described herein, may include 2 reads and 3/m writes per cell of the pose configuration space 112 for the processing pass that includes computing reachability originated within a section. For the processing pass that includes propagating the section outputs may include 8/m reads and 2/m writes. The processing pass that uses section reachability as inputs may include 2 (or 3) reads and 1 write. Thus, the parallel reduction pattern may be accomplished in 5+8/m reads and 1+5/m writes, or a total of 6+13/m accesses. This may be compared to processing without sections, which may include 2 reads and 1 write×3 passes and 3 reads and 1 write for a final pass, or a total of 9 reads, 4 writes and 13 total memory accesses. As such, section processing may save more than a factor of two in memory accesses. Additionally, further savings may be achieved by caching the freespace or occupancy and reachability inputs in shared memory between the first and third passes, saving the two read operations in the third pass and resulting in 4+13/m accesses to save more than a factor of three in memory accesses. The parallel reduction pattern approach also exposes more parallelism since there are M/m sections within each turn that can be worked in parallel.

As described herein, the trajectory assessor 150 of the path evaluator 130 may use the reachability space(s) annotated by the reachability evaluator 148 over one or more iterations to identify and/or select a path using the back tracer 152. In one or more embodiments, the back tracer 152 may back-trace to find a path that achieved in the smallest number of trajectories or turns (or more generally, the lowest cost path) to reach a goal. The back tracer 152 may be performed by a CPU and/or with parallel processing (e.g., using at least one GPU).

In at least one embodiment, the back tracer 152 may search for one or more cells in a target set of one or more poses for which the final reachability output is set in the reachability space(s). For example, the back tracer 152 may loop over a target set of poses, or if parallelism desired, using a parallel reduction. If there is more than one cell that has reachability set, then one or more poses may be selected by some preference function, such as based on closeness to some selected pose. If there is no such pose, this may indicate there is no N-turn path plan that reaches the target set, in which case an (N+1)-turn plan could be evaluated.

Once a cell is selected to start a back-trace from, it may be assumed that the cell was reached after i iterations and one of the turn types reached the pose from another pose that was reached one iteration earlier (on iteration i−1). The back tracer 152 may therefore back-trace all K turn types from that cell, and somewhere along them, it will find a cell that is set to reachable in an output reachability space from the iteration i−1. As the turns may have repeatable coordinate definitions, they may be back-traced exactly as evaluated. This back-trace of K turns can be done sequentially by a CPU, or by a parallel reduction. There may be cyclic ambiguity as a turn may have been used in the forward or backward direction. The ambiguity may be resolved by checking the freespace along the back-traced turns and stopping the back-trace if an obstacle is found (in embodiments where obstacles may completely block a path).

In the case of a more general cost function, the criterion may be to find the cell with the lowest cost among those for which the cost reduction is equal to the cost of the back-traced turn. If there is more than one cell that satisfies the criterion, a heuristic could be used to select a cell, such as pick the cell that requires the shortest turn to reach. If the target set was reached in less than N turns, some of the initial back-tracing steps will find a reachable cell from the previous iteration as the same cell (because that turn step was not required). The back tracer 152 may determine this criterion is satisfied and remove that turn from a path solution. Once a cell is found, the process may be repeated from that cell until a reachable cell is found after iteration 1. The back-trace may conclude with the current pose representing the reachable space before any turns, and may be performed with the current pose to resolve the cyclic ambiguity.

Figure 10:
FIG. 10 is a flow diagram showing a method for determining shifted poses of a pose configuration space to determine a path through the pose configuration space, in accordance with some embodiments of the present disclosure.

Now referring to FIG. 10, each block of method 1000 and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the path planner 110 of FIGS. 1A and 1B. However, these methods may additionally or alternatively be executed by any one system, or any combination of systems, including, but not limited to, those described herein.

FIG. 10 is a flow diagram showing a method 1000 for determining shifted poses of a pose configuration space to determine a path through the pose configuration space, in accordance with some embodiments of the present disclosure. The method 1000, at block B1002, includes determining shifted poses based at least on translating poses of a pose configuration space to produce shifted trajectories that includes the shifted poses. For example, the pose translator 146 of the reachability manager 122 may determine shifted poses of the pose configuration space 112 that represents poses of an object (e.g., the vehicle 1300) in an environment based at least on translating a set of the poses that correspond to trajectories (e.g., the turns 618 and 610 in FIG. 6B) in the pose configuration space 112 along at least one axis (e.g., the θ-axis) to produce shifted trajectories that include the shifted poses (e.g., the turns 618 and 610 in FIG. 6C).

The method 1000, at block B1004, includes determining a path through the pose configuration space based at least on evaluating reachability of the shifted poses using parallel processing of the shifted trajectories. For example, the path evaluator 130 may determining a path from the current pose C in FIG. 1A to a target pose T in FIG. 1A based at least on the reachability evaluator 148 evaluating reachability of the shifted poses of the shifted trajectories from the first pose using parallel processing of the shifted trajectories (e.g., according to the pseudocode 830 or 930).

Referring now to FIG. 11, FIG. 11 is a flow diagram showing a method 1100 for translating trajectories of poses in a pose configuration space into shifted trajectories to determine a path through the pose configuration space, in accordance with some embodiments of the present disclosure. The method 1100, at block B1102, includes translating trajectories of poses in a pose configuration space into shifted trajectories that include one or more sections parallel to one another and to at least one axis of the pose configuration space. For example, the pose translator 146 may translate trajectories formed by poses in the pose configuration space 112 into shifted trajectories that include at least sections parallel to one another and to at least one axis of the pose configuration space 112.

The method 1100, at block B1104, includes processing at least the sections of the shifted trajectories in parallel along the at least one axis to compute indicators of reachability associated with the shifted trajectories. For example, the reachability evaluator 148 may process at least the sections of the shifted trajectories in parallel along the at least one axis to compute indicators of reachability associated with the shifted trajectories (e.g., according to the pseudocode 830 or 930).

The method 1100, at block B1106, includes determining a path through the pose configuration space based at least on the indicators of reachability. For example, the path evaluator 130 may determine a path through the pose configuration space 112 based at least on the indicators of reachability.

FIG. 12 is a flow diagram showing a method 1200 for evaluating reachability of sections of a trajectory in parallel, in accordance with some embodiments of the present disclosure. The method 1200, at block B1202, includes computing, for a first section of sections of a trajectory of poses in a pose configuration space, an indicator(s) of the reachability leaving the first section. For example, the reachability evaluator 148 may compute, for a first section of sections of the turn 618 of FIGS. 6B and 6C, formed by poses in the pose configuration space 112, an indicator(s) of the reachability leaving the first section.

The method 1200, at block B1204, includes computing an indicator(s) of the reachability entering a second section of the sections using the indicator of the reachability leaving the first section. For example, the reachability evaluator 148 may compute an indicator(s) of the reachability entering a second section of the sections using the indicator of the reachability leaving the first section.

The method 1200, at block B1206, includes computing an indicator(s) of the reachability for a pose(s) within the first section using the indicator of the reachability entering the second section. For example, the reachability evaluator 148 may compute an indicator(s) of the reachability for a pose(s) within the first section (e.g., with respect to the current pose C in FIG. 1A) using the indicator of the reachability entering the second section. The method 1200 may be performed in parallel for a plurality of trajectories using parallel processing as part of a parallel reduction pattern.

Example Autonomous Vehicle

Figure 13A:
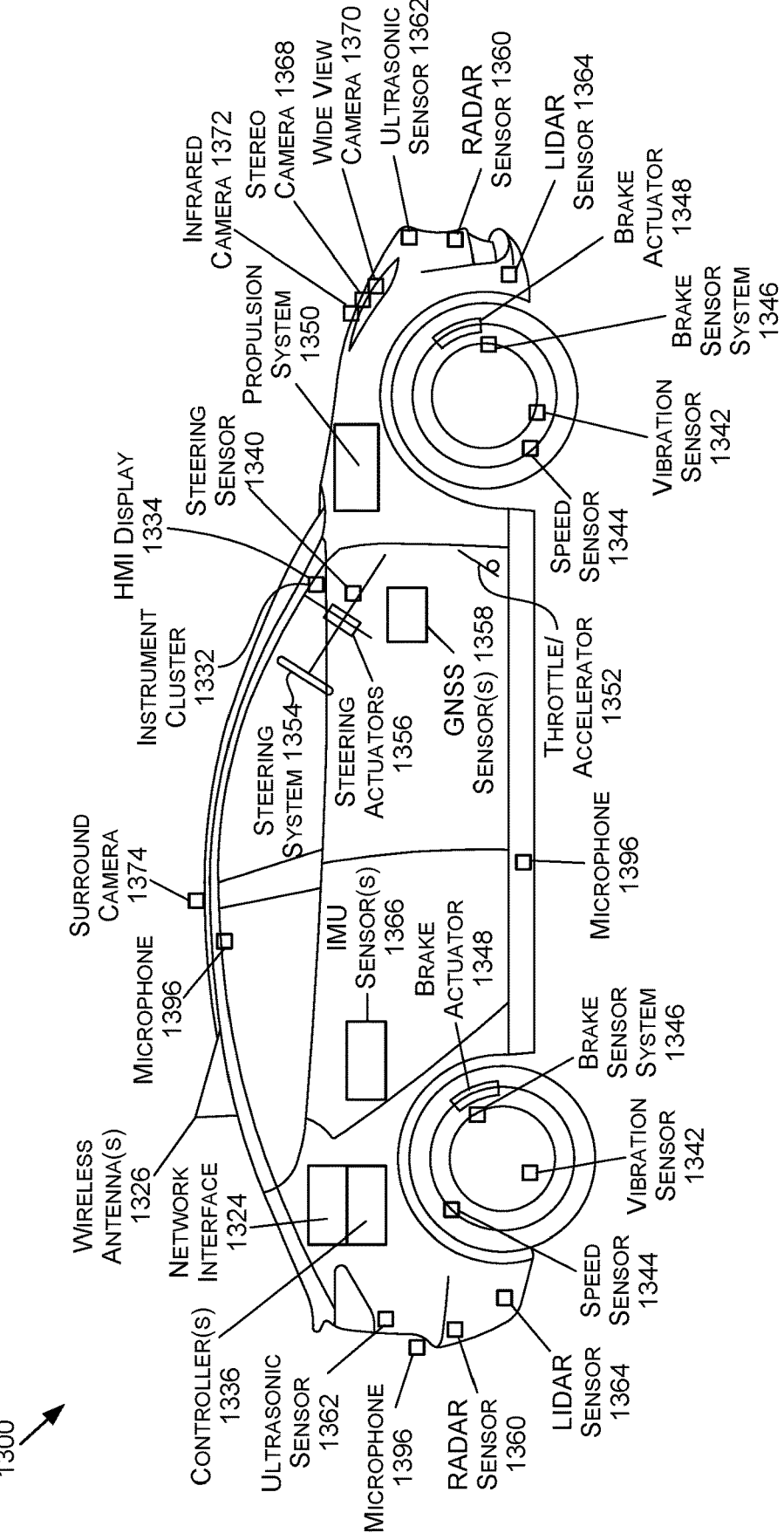
FIG. 13A is an illustration of an example autonomous vehicle, in accordance with some embodiments of the present disclosure.

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. For example, the vehicle 1300 may be capable of conditional automation (Level 3), high automation (Level 4), and/or full automation (Level 5), depending on the embodiment.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range and/or mid-range camera(s) 1398, speed sensor(s) 1344 (e.g., for measuring the speed of the vehicle 1300), vibration sensor(s) 1342, steering sensor(s)

1340, brake sensor(s) (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the HD map 1322 of FIG. 13C), location data (e.g., the vehicle's 1300 location, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324 which may use one or more wireless antenna(s) 1326 and/or modem(s) to communicate over one or more networks. For example, the network interface 1324 may be capable of communication over LTE, WCDMA, UMTS, GSM, CDMA2000, etc. The wireless antenna(s) 1326 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LPWANs), such as LoRaWAN, SigFox, etc.

Figure 13B:
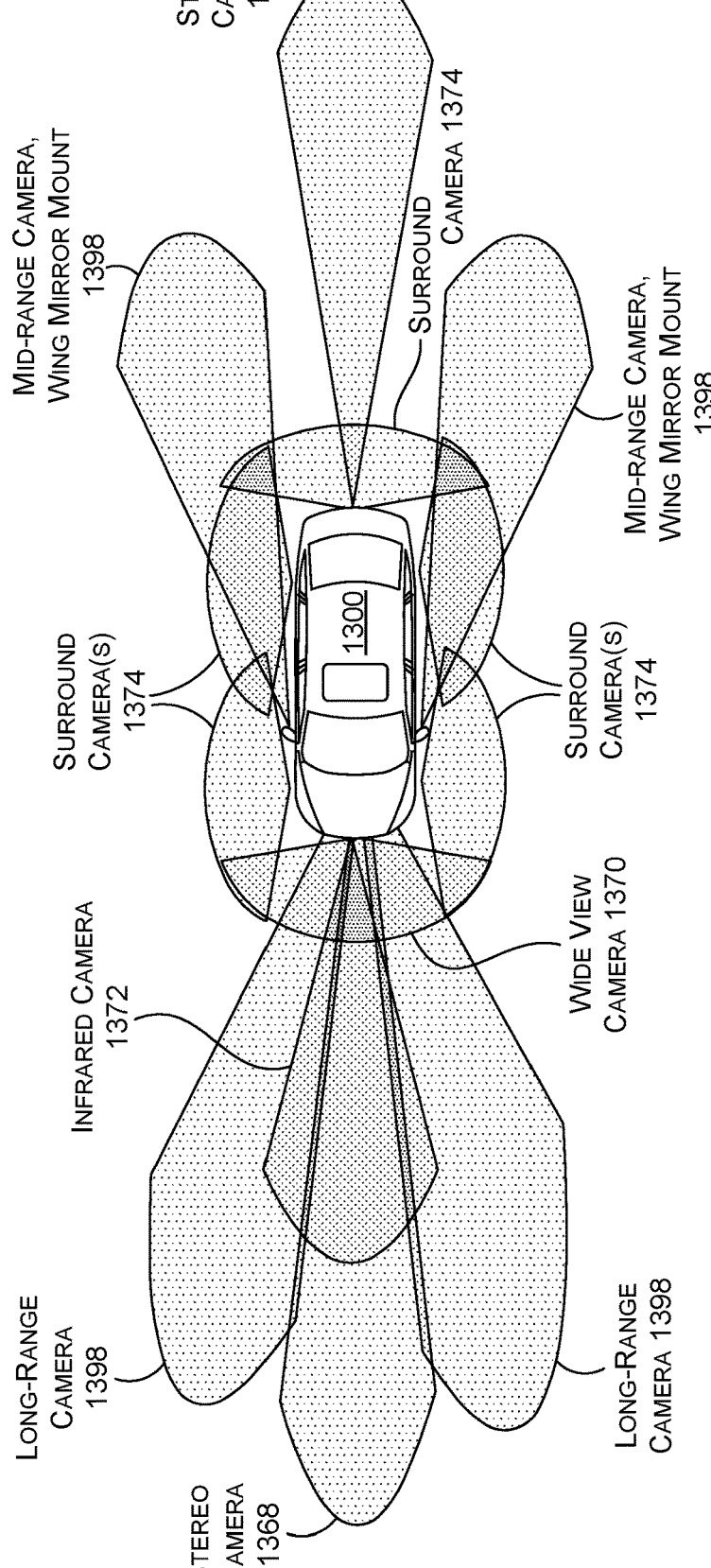
FIG. 13B is an example of camera locations and fields of view for the example autonomous vehicle of FIG. 13A, in accordance with some embodiments of the present disclosure.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1300 (e.g., front-facing cameras) may be used for surround view, to help identify forward facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may any number of wide-view cameras 1370 on the vehicle 1300. In addition, long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

One or more stereo cameras 1368 may also be included in a front-facing configuration. The stereo camera(s) 1368 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that include portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned to on the vehicle 1300. The surround camera(s) 1374 may include wide-view camera(s) 1370, fisheye camera(s), 360 degree camera(s), and/or the like. Four example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

Figure 13C:
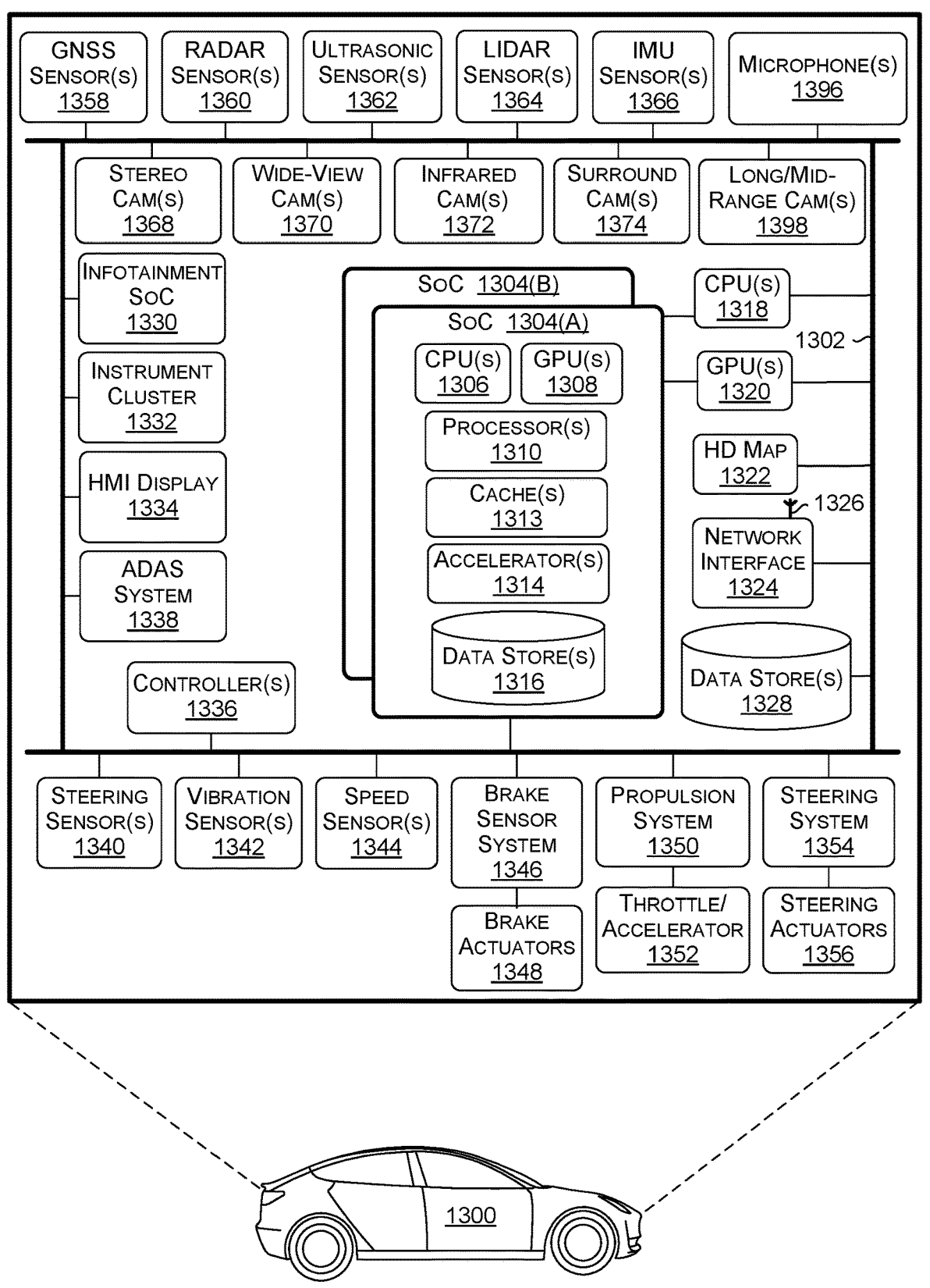
FIG. 13C is a block diagram of an example system architecture for the example autonomous vehicle of FIG. 13A, in accordance with some embodiments of the present disclosure.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C are illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol. In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300, and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s) 1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use compute application programming interface(s) (API(s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include an arithmetic logic unit(s) (ALU(s)) which may be leveraged in performing processing with respect to any of the variety of tasks or operations of the vehicle 1300—such as processing DNNs. In addition, the SoC(s) 1304 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1306 and/or GPU(s) 1308.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1312 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU(s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high-dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and active doing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, that use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328 which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358. The GNSS sensor(s) 1358 (e.g., GPS, assisted GPS sensors, differential GPS (DGPS) sensors, etc.), to assist in mapping, perception, occupancy grid generation, and/or path planning functions. Any number of GNSS sensor(s) 1358 may be used, including, for example and without limitation, a GPS using a USB connector with an Ethernet to Serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1300 surroundings at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360 m (front) or 80 m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5 m, 4 m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree field of view. Commercially available LIDAR sensor(s) 1364 may have an advertised range of approximately 1300 m, with an accuracy of 2 cm-3 cm, and with support for a 1300 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 120-degree horizontal and 35-degree vertical field-of-view, with a 200 m range even for low-reflectivity objects. Front-mounted LIDAR sensor(s) 1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjust the vehicle speed to maintain a safe distance from vehicles ahead. Lateral ACC performs distance keeping, and advises the vehicle 1300 to change lanes when necessary. Lateral ACC is related to other ADAS applications such as LCA and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1300), while the I2V communication concept provides information about traffic further ahead. CACC systems may include either or both I2V and V2V information sources. Given the information of the vehicles ahead of the vehicle 1300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network which is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1300. For example, the infotainment SoC 1330 may radios, disk players, navigation systems, video players, USB and Bluetooth connectivity, carputers, in-car entertainment, Wi-Fi, steering wheel audio controls, hands free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

Figure 13D:
FIG. 13D is a system diagram for communication between cloud-based server(s) and the example autonomous vehicle of FIG. 13A, in accordance with some embodiments of the present disclosure.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced road-work. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, one or more presentation components 1418 (e.g., display(s)), and one or more logic units 1420. In at least one embodiment, the computing device(s) 1400 may comprise one or more virtual machines (VMs), and/or any of the components thereof may comprise virtual components (e.g., virtual hardware components). For non-limiting examples, one or more of the GPUs 1408 may comprise one or more vGPUs, one or more of the CPUs 1406 may comprise one or more vCPUs, and/or one or more of the logic units 1420 may comprise one or more virtual logic units. As such, a computing device(s) 1400 may include discrete components (e.g., a full GPU dedicated to the computing device 1400), virtual components (e.g., a portion of a GPU dedicated to the computing device 1400), or a combination thereof.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1420 and/or communication interface 1410 may include one or more data processing units (DPUs) to transmit data received over a network and/or through interconnect system 1402 directly to (e.g., a memory of) one or more GPU(s) 1408.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof.

The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, DPUs, etc.), and output the data (e.g., as an image, video, sound, etc.).

Example Data Center

Figure 15:
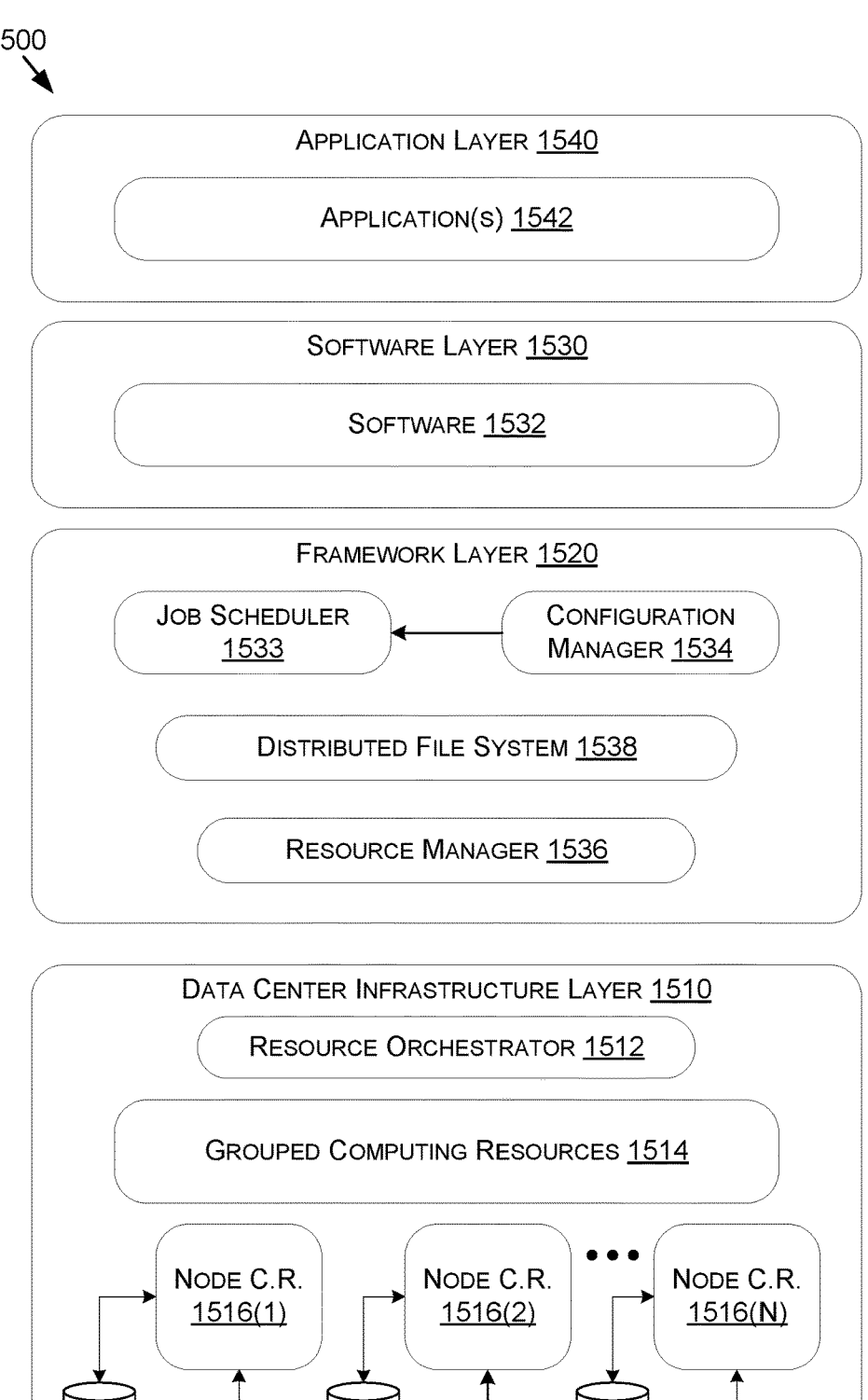
FIG. 15 is a block diagram of an example data center suitable for use in implementing some embodiments of the present disclosure.

FIG. 15 illustrates an example data center 1500 that may be used in at least one embodiments of the present disclosure. The data center 1500 may include a data center infrastructure layer 1510, a framework layer 1520, a software layer 1530, and/or an application layer 1540.

As shown in FIG. 15, the data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1516(1)-1516(N) may correspond to a server having one or more of the above-mentioned computing resources. In addition, in some embodiments, the node C.R.s 1516(1)-15161(N) may include one or more virtual components, such as vGPUs, vCPUs, and/or the like, and/or one or more of the node C.R.s 1516(1)-1516(N) may correspond to a virtual machine (VM).

In at least one embodiment, grouped computing resources 1514 may include separate groupings of node C.R.s 1516 housed within one or more racks (not shown), or many racks housed in data centers at various geographical locations (also not shown). Separate groupings of node C.R.s 1516 within grouped computing resources 1514 may include grouped compute, network, memory or storage resources that may be configured or allocated to support one or more workloads. In at least one embodiment, several node C.R.s 1516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1512 may configure or otherwise control one or more node C.R.s 1516(1)-1516(N) and/or grouped computing resources 1514. In at least one embodiment, resource orchestrator 1512 may include a software design infrastructure (SDI) management entity for the data center 1500. The resource orchestrator 1512 may include hardware, software, or some combination thereof.

In at least one embodiment, as shown in FIG. 15, framework layer 1520 may include a job scheduler 1533, a configuration manager 1534, a resource manager 1536, and/or a distributed file system 1538. The framework layer

1520 may include a framework to support software 1532 of software layer 1530 and/or one or more application(s) 1542 of application layer 1540. The software 1532 or application(s) 1542 may respectively include web-based service software or applications, such as those provided by Amazon Web Services, Google Cloud and Microsoft Azure. The framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1533 may include a Spark driver to facilitate scheduling of workloads supported by various layers of data center 1500. The configuration manager 1534 may be capable of configuring different layers such as software layer 1530 and framework layer 1520 including Spark and distributed file system 1538 for supporting large-scale data processing. The resource manager 1536 may be capable of managing clustered or grouped computing resources mapped to or allocated for support of distributed file system 1538 and job scheduler 1533. In at least one embodiment, clustered or grouped computing resources may include grouped computing resource 1514 at data center infrastructure layer 1510. The resource manager 1536 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516 (1)-1516(N), grouped computing resources 1514, and/or distributed file system 1538 of framework layer 1520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. Self-modifying actions may relieve a data center operator of data center 1500 from making possibly bad configuration decisions and possibly avoiding underutilized and/or poor performing portions of a data center.

The data center 1500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1500. In at least one embodiment, trained or deployed machine learning models corresponding to one or more neural networks may be used to infer or predict information using resources described above with respect to the data center 1500 by using weight parameters calculated through one or more training techniques, such as but not limited to those described herein.

In at least one embodiment, the data center 1500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1400 of FIG. 14—e.g., each device may include similar components, features, and/or functionality of the computing device(s) 1400. In addition, where backend devices (e.g., servers, NAS, etc.) are implemented, the backend devices may be included as part of a data center 1500, an example of which is described in more detail herein with respect to FIG. 15.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1400 described herein with respect to FIG. 14. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
determining a discretized space of poses indicating that a first set of the poses corresponding to a first trajectory and a second set of the poses corresponding to a second trajectory are each reachable from a common pose of the poses corresponding to a machine in an environment;
computing, using the discretized space, reachability of the first set of the poses corresponding to the first trajectory;
computing, using the discretized space, reachability of the second set of the poses corresponding to the second trajectory;
merging the reachability of the first set of the poses with the reachability of the second set of the poses to determine a merged discretized space of the poses;
determining a path corresponding to the common pose using the merged discretized space; and
performing one or more control operations for the machine using the path.

2. The method of claim 1, wherein the merging includes performing one or more logical bit-wise operations on corresponding bits from a first set of bits indicating the reachability of the first set of the poses and a second set of bits indicating the reachability of the second set of the poses to produce a third set of bits corresponding to the merged discretized space.

3. The method of claim 1, wherein the merging includes combining corresponding cost values from a first set of cost values indicating the reachability of the first set of the poses and a second set of cost values indicating the reachability of the second set of the poses to produce a third set of cost values corresponding to the merged discretized space.

4. The method of claim 1, wherein the determining the path includes:
selecting an initial pose from the merged discretized space of the poses;
back-tracing the path through a plurality of trajectories using corresponding poses in the merged discretized space of the poses.

5. The method of claim 1, wherein the first trajectory and the second trajectory are modeled as respective turns using a fixed turn radius throughout.

6. The method of claim 1, wherein the merged discretized space includes cost values parameterized at least by the poses, and the determining of the path includes tracing from a first pose of the path to a second pose of the path using the cost values.

7. The method of claim 1, further comprising:
determining freespace of the poses based at least on collision testing the machine having the poses against one or more obstacles; and
storing indicators of the freespace in one or more occupancy spaces parameterized at least by the poses, wherein the computing the reachability of the first set of the poses is based at least on evaluating the indicators of the freespace in the one or more occupancy spaces against the first set of the poses.

8. The method of claim 1, further comprising:
determining, using the merged discretized space, reachability of a third set of the poses corresponding to a third trajectory that extends at least the first trajectory;
computing, using the merged discretized space, reachability of a fourth set of the poses corresponding to a fourth trajectory that extends at least the second trajectory; and
merging the reachability of the third set of the poses with the reachability of the fourth set of the poses to determine a second merged discretized space of the poses, wherein the determining the path includes tracing through the second merged discretized space of the poses.

9. A system comprising:
one or more processors; and
one or more memory devices storing instructions that, when executed by the one or more processors, cause the one or more processors to perform a method comprising:
computing first indicators of reachability of a first set of poses corresponding to a first trajectory for a machine and second indicators of reachability of a second set of poses corresponding to a second trajectory for the machine;
merging the first indicators with the second indicators to determine merged indicators of reachability;
determining a path for the machine using the merged indicators of reachability; and
performing one or more control operations for the machine using the path.

10. The system of claim 9, wherein the first indicators include a first set of bits, the second indicators include a second set of bits, and the merging includes performing one or more logical bit-wise operations on corresponding bits from the first set of bits and the second set of bits to produce a third set of bits corresponding to the merged indicators of reachability.

11. The system of claim 9, wherein the first indicators include a first set of cost values, the second indicators include a second set of cost values, and the merging includes combining corresponding cost values from the first set of cost values and the second set of cost values to produce a third set of cost values corresponding to the merged indicators of reachability.

12. The system of claim 9, wherein the first indicators of reachability are stored in a first discretized space of poses, the second indicators of reachability are stored in a second discretized space of poses, and the merging includes combining the first discretized space of poses with the second discretized space of poses to produce a merged discretized space of poses that includes the merged indicators of reachability.

13. The system of claim 9, wherein the first trajectory and the second trajectory are modeled as respective turns using a fixed turn radius throughout.

14. The system of claim 9, wherein the merged indicators of reachability include cost values parameterized at least by poses, and the determining of the path includes tracing from a first pose of the path to a second pose of the path using the cost values.

15. The system of claim 9, wherein the system is comprised in at least one of:
a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

16. A non-transitory computer-readable storage device having instructions stored thereon that, when executed by one or more processors, cause one or more circuits to:

perform one or more control operations for a machine using a path determined using merged indicators of reachability, the merged indicators of reachability computed based at least on combining first indicators of reachability of a first set of poses corresponding to a first trajectory and second indicators of reachability of a second set of poses corresponding to a second trajectory.

17. The non-transitory computer-readable storage device of claim 16, wherein the merged indicators of reachability are determined using one or more logical bit-wise operations performed on corresponding bits from a first set of bits indicating the reachability of the first set of poses and a second set of bits indicating the reachability of the second set of poses.

18. The non-transitory computer-readable storage device of claim 16, wherein the merged indicators of reachability correspond to a combination of corresponding cost values from a first set of cost values included in the first indicators of reachability and a second set of cost values included in the second indicators of reachability.

19. The non-transitory computer-readable storage device of claim 16, wherein the merged indicators of reachability include cost values parameterized at least by poses, and the path is determined based at least on tracing the path from a first pose of the path to a second pose of the path using the cost values.

20. The non-transitory computer-readable storage device of claim 16, wherein the is one or more circuits are comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

* * * * *